US009626255B2

(12) United States Patent
Guntaka et al.

(10) Patent No.: US 9,626,255 B2
(45) Date of Patent: Apr. 18, 2017

(54) ONLINE RESTORATION OF A SWITCH SNAPSHOT

(71) Applicant: BROCADE COMMUNICATIONS SYSTEMS, INC., San Jose, CA (US)

(72) Inventors: Vidyasagara R. Guntaka, San Jose, CA (US); Manjunath A. G. Gowda, San Jose, CA (US); Himanshu Varshney, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 103 days.

(21) Appl. No.: 14/588,106

(22) Filed: Dec. 31, 2014

(65) Prior Publication Data

US 2016/0188422 A1 Jun. 30, 2016

(51) Int. Cl.
*G06F 11/07* (2006.01)
*G06F 11/14* (2006.01)

(52) U.S. Cl.
CPC ...... *G06F 11/1469* (2013.01); *G06F 11/1441* (2013.01); *G06F 11/1451* (2013.01); *G06F 2201/80* (2013.01); *G06F 2201/82* (2013.01)

(58) Field of Classification Search
CPC ............. G06F 2201/84; G06F 11/1471; G06F 11/1458

(Continued)

(56) References Cited

U.S. PATENT DOCUMENTS

| 829,529 A | 8/1986 | Keathley |
| 5,390,173 A | 2/1995 | Spinney |

(Continued)

FOREIGN PATENT DOCUMENTS

| CN | 102801599 A | 11/2012 |
| EP | 0579567 | 5/1993 |

(Continued)

OTHER PUBLICATIONS

Office action dated Apr. 30, 2015, U.S. Appl. No. 13/351,513, filed Jan. 17, 2012.

(Continued)

*Primary Examiner* — Chae Ko
(74) *Attorney, Agent, or Firm* — Shun Yao; Park, Vaughan, Fleming & Dowler LLP

(57) ABSTRACT

One embodiment of the present invention provides a switch. The switch includes one or more ports, a persistent storage module, a restoration module, and a retrieval module. The persistent storage module stores configuration information associated with the switch in a data structure, which includes one or more columns for attribute values of the configuration information, in a local persistent storage. The restoration module instantiates a restoration database instance in the persistent storage from an image of the persistent storage. The retrieval module retrieves attribute values from a data structure in a current database instance and the restoration database instance in the persistent storage. The restoration module then applies the differences between attribute values of the restoration database instance and the current database instance in the persistent storage to switch modules of the switch, and operates the restoration database instance as the current database instance in the persistent storage.

24 Claims, 22 Drawing Sheets

(58) Field of Classification Search
USPC .................................................. 714/15, 20
See application file for complete search history.

(56) References Cited

U.S. PATENT DOCUMENTS

| | | | |
|---|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrll, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | J Ha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,798,045 B1 | 8/2014 | Aybay |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 9,178,793 B1 | 11/2015 | Marlow |
| 9,350,680 B2 | 5/2016 | Thayalan |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1* | 5/2003 | Lolayekar ........... H04L 67/1097 709/246 |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0174706 A1 | 9/2003 | Shankar |

(56) References Cited

U.S. PATENT DOCUMENTS

| | | |
|---|---|---|
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0088668 A1 | 5/2004 | Hamlin |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0074052 A1 | 3/2007 | Hemmah |
| 2007/0081530 A1 | 4/2007 | Nomura |
| 2007/0083625 A1* | 4/2007 | Chamdani ............ H04Q 3/0045 709/223 |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |

(56) References Cited

U.S. PATENT DOCUMENTS

| | | |
|---|---|---|
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0055274 A1 | 3/2011 | Scales |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1* | 4/2012 | Breh .................... G06F 9/5061 709/220 |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |

(56) References Cited

U.S. PATENT DOCUMENTS

| | | |
|---|---|---|
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1* | 3/2013 | Ahmad ............... G06F 9/44526 709/203 |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1* | 5/2013 | Koppenhagen ...... G06Q 10/101 705/342 |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan |
| 2013/0308492 A1* | 11/2013 | Baphna ............... H04L 41/0803 370/254 |
| 2013/0308647 A1 | 11/2013 | Rosset |
| 2013/0315586 A1 | 11/2013 | Kipp |
| 2013/0322427 A1 | 12/2013 | Stiekes |
| 2013/0332660 A1* | 12/2013 | Talagala ............... G06F 12/0246 711/103 |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0157251 A1 | 6/2014 | Hocker |
| 2014/0258446 A1 | 9/2014 | Bursell |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0010007 A1 | 1/2015 | Matsuhira |
| 2015/0030031 A1 | 1/2015 | Zhou |
| 2015/0127618 A1* | 5/2015 | Alberti ............... G06F 11/1402 707/678 |
| 2015/0143369 A1 | 5/2015 | Zheng |
| 2015/0172098 A1 | 6/2015 | Agarwal |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1* | 3/2016 | Tung ............... H04L 41/12 709/223 |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 2001167 A1 | 8/2007 |
| EP | 1916807 A2 | 4/2008 |
| EP | 2874359 | 5/2015 |
| WO | 2008056838 | 5/2008 |
| WO | 2009042919 | 4/2009 |
| WO | 2010111142 A1 | 9/2010 |
| WO | 2011140028 A1 | 11/2011 |
| WO | 2014031781 | 2/2014 |

OTHER PUBLICATIONS

Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.

(56) References Cited

OTHER PUBLICATIONS

Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
Fastlron Configuration Guide Supporting Ironware Software Release 07.0.00, Dec. 18, 2009.
Foundary Fastlron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.

(56) References Cited

OTHER PUBLICATIONS

Narten, T. et al., 'Problem Statement: Overlays for Network Virtualization d raft-narten-n vo3-over l ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/087,239, filed Apr. 14, 2011, dated May 22, 2013.
Office Action for U.S. Appl. No. 13/092,724, filed Apr. 22, 2011, dated Jul. 16, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
Zhai F. Hu et al. 'RBridge: Pseudo-Nickname; draft-hu-trill-pseudonode-nickname-02.txt', May 15, 2012.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade, 'FastIron and TurboIron 24x Configuration Guide', Feb. 16, 2010.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
'RBridges: Base Protocol Specification', IETF Draft, Perlman et al., Jun. 26, 2009.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.

(56) References Cited

OTHER PUBLICATIONS

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.

\* cited by examiner

```
XML DEFINITION
        400

<ManagedObject NAME = "Node" >
 <ATTRIBUTE NAME = "NodeID" TYPE = "STRING" />
   ||||
   ||||
 <ATTRIBUTE NAME = "getsPower" TYPE = "1-1-Association" RELATEDTO = "PowerSource"/>
   ||||
   ||||
 <ATTRIBUTE NAME = "includes" TYPE = "1-M-Association" RELATEDTO = "LineCard"/>
   ||||
   ||||
< ManagedObject />
```

FIG. 4B

ONLINE RESTORATION OF A SWITCH SNAPSHOT

RELATED APPLICATION

The present disclosure is related to U.S. Pat. No. 8,867,552, titled "Virtual Cluster Switching," by inventors Suresh Vobbilisetty and Dilip Chatwani, issued 21 Oct. 2014; and U.S. patent application Ser. No. 14/512,268, titled "Distributed Configuration Management in a Switch Group," by inventors Vidyasagara R. Guntaka, Suresh Vobbilisetty, Manjunath A. G. Gowda, and Himanshu Varshney, filed 10 Oct. 2014, the disclosures of which are incorporated by reference herein.

BACKGROUND

Field

The present disclosure relates to communication networks. More specifically, the present disclosure relates to a method for a constructing a scalable system with online restoration support.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch. However, to facilitate restoration to a previously saved switch configuration of a member switch, a user typically takes a snapshot of the files to run the switch and stores the snapshot. This requires manual and tedious intervention of a user. Furthermore, during restoration, the switch is typically rebooted with that snapshot. Hence, during the restoration operation, the switch becomes offline and unavailable from the fabric switch.

Meanwhile, a switch, an individual or a member switch of a fabric switch, continues to store more configuration information as the switch participates in network virtualizations, partitions, and switch groups, and operates on a plurality of network protocols of different network layers. This configuration needs to be applied to the switch when the switch powers up, and thus, should be persistent. A switch typically stores such configuration information in a local storage in an unstructured format. The switch reads the information during booting up (i.e., powering up), and loads the information into memory. Managing persistent storage in unstructured format is inefficient and requires runtime structuring.

While persistent storage brings many desirable features to a switch, some issues remain unsolved in efficiently facilitating online restoration of a switch snapshot in a switch.

SUMMARY

One embodiment of the present invention provides a switch. The switch includes one or more ports, a persistent storage module, a restoration module, and a retrieval module. The persistent storage module stores configuration information associated with the switch in a data structure, which includes one or more columns for attribute values of the configuration information, in a local persistent storage. The restoration module instantiates a restoration database instance in the persistent storage from an image of the persistent storage. The retrieval module retrieves attribute values from a data structure in a current database instance and the restoration database instance in the persistent storage. The restoration module then applies the differences between attribute values of the restoration database instance and the current database instance in the persistent storage to switch modules of the switch, and operates the restoration database instance as the current database instance in the persistent storage.

In a variation on this embodiment, the data structure is associated with a class definition from a class model. The class model defines a name and one or more attributes for the class definition.

In a further variation, the retrieval module identifies an element of the configuration information from a presentation layer. This element of the configuration information is associated with the class definition in the class model.

In a further variation, the presentation layer represents a user view of the configuration information and dependencies of the element of the configuration information.

In a variation on this embodiment, the differences include attribute values to be removed from and added to the switch modules. The restoration module then applies the attribute values to be removed before applying the attribute values to be added.

In a further variation, the restoration module applies the respective attribute values to be removed and to be added based on respective interdependencies of the attribute values.

In a variation on this embodiment, the retrieval module determines the differences based on a set difference between respective attribute values of the restoration database instance and the current database instance.

In a variation on this embodiment, the restoration module associates a filename and a timestamp with the image of the persistent storage and obtains the image of the persistent storage based on one or more of: (i) an internal file structure of the switch, (ii) a file path, which can be specified by a user, in the switch, (iii) a location of an external file respiratory, and (iv) a checkpoint of the persistent storage.

In a variation on this embodiment, the switch also includes a switch group module which maintains a membership in a switch group. The switch group includes a plurality of switches and operates as a single switch.

In a further variation, the restoration module verifies whether the differences are prepared for storage in a persistent storage of a respective switch of the switch group. If prepared, the restoration module generates an instruction message instructing to commit the differences to the persistent storage and switch modules of a respective switch of the switch group.

In a further variation, if the differences are not prepared, the restoration module rolls back the differences from a persistent storage of a switch, which has succeeded in storage preparation, of the switch group.

In a variation on this embodiment, the persistent storage is an object relational database, and a data structure in the persistent storage is a table in the database.

BRIEF DESCRIPTION OF THE FIGURES

FIG. 4B illustrates an exemplary Extensible Markup Language (XML) representation of a class corresponding to a switch with a persistent storage framework, in accordance with an embodiment of the present invention.

In the figures, like reference numerals refer to the same figure elements.

DETAILED DESCRIPTION

Figure 1A:
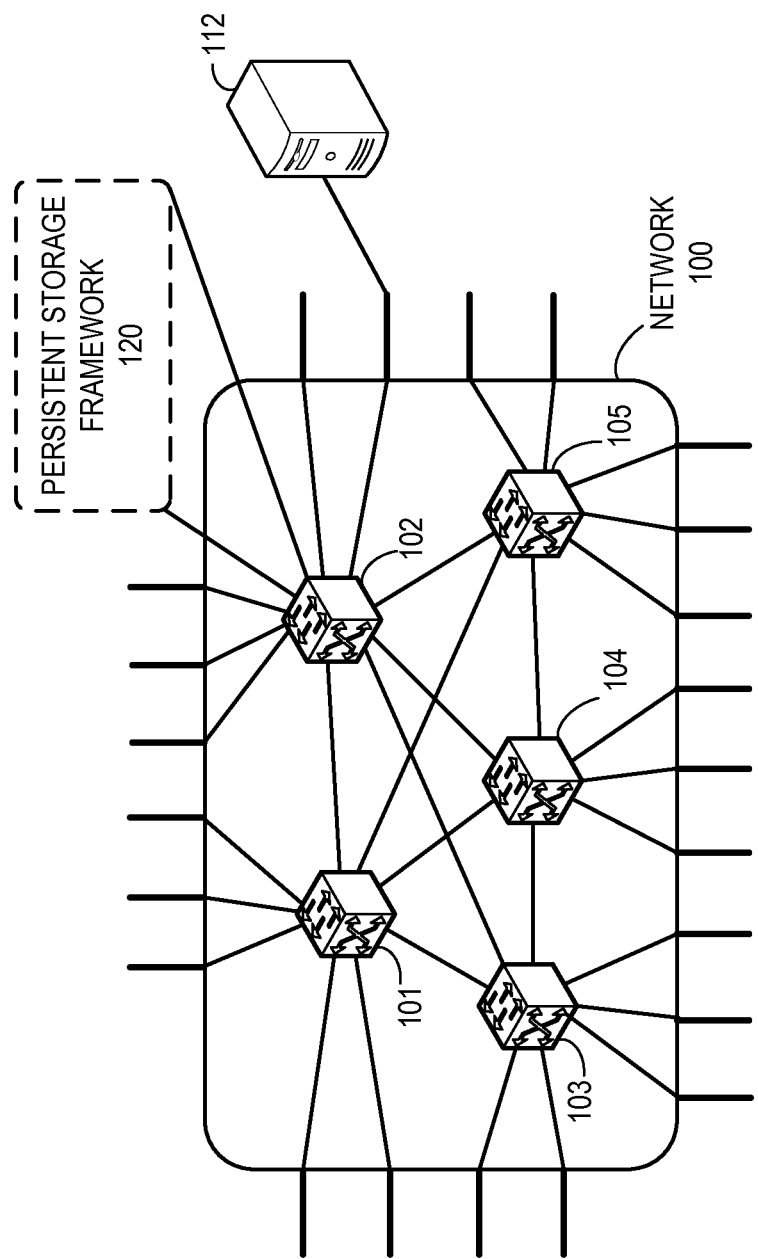
FIG. 1A illustrates an exemplary network with persistent storage framework support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of online restoration of a switch snapshot is solved by obtaining a difference between the switch snapshot and the current configuration information from a persistent storage. The switch then applies the difference to the switch modules, thereby restoring the switch snapshot while keeping the switch online (i.e., operational). The switch snapshot describes the state of the switch at a particular moment in time. Typically, the switch snapshot includes images of the files needed to run the switch.

With existing technologies, a switch can be configured by logging in to the switch (e.g., via telnet) or via a console port (e.g., an RS-232 port). Such configuration can be related to network virtualizations, partitions, and switch groups, and a plurality of network protocols of different network layers. The attribute values (e.g., parameters) of the configuration information are applied to the switch (e.g., loaded to the switch modules). In some embodiments, a switch can be in a switch group (e.g., a fabric switch). One of the switches in the switch group is elected as a principal switch, which manages and distributes configuration information in the switch group. The rest of the switches of the switch group can be referred to as managed switches. When a user accesses this principal switch, the principal switch allows the user to configure the global configuration information of the switch group. The principal switch, in turn, synchronizes that global configuration information with a respective managed switch. Furthermore, the principal switch also allows the user to configure a respective managed switch in the switch group. The principal switch, in turn, synchronizes that local configuration information to that managed switch.

Configuration of a switch can continue to change due to different circumstances. If a user identifies configuration information for which the switch is operating in a desirable way, the user can take a snapshot of the files to run the switch and stores the snapshot. This snapshot can be referred to a switch snapshot. To do so, the user typically retrieves the current configuration (e.g., executes a "show running-config" command) of the switch and stores that configuration information in a text file. This requires manual and tedious intervention of a user. If needed, the user can restore this saved switch snapshot to the switch (i.e., apply the corresponding configuration information). During restoration, the switch is usually rebooted with that stored switch snapshot. Hence, during the restoration operation, the switch becomes offline and unavailable. If the switch is a member switch of a switch group, the service of that switch remains unavailable during the restoration process. Furthermore, after restoration, the switch group may require re-convergence.

To solve this problem, a switch uses a persistent storage to store configuration information of the switch. When a switch snapshot is taken, a corresponding persistent storage image is created. During the restoration operation, the persistent storage image is retrieved and instantiated in the underlying persistent storage. This can be referred to as a restoration database instance of the persistent storage. A database instance can include database states at a point in time defined through the content and relationship, and their attributes. Database instance typically includes a database environment, including the table structure, stored procedures, and other functionality. At this point, the persistent storage includes a current instance, which includes the current configuration information of the switch, as well as the restoration instance, which includes the configuration information of the restoration database image. In some embodiments, the switch uses a presentation layer (e.g., a YANG model) of the configuration information of the switch. The switch identifies one or more Unified Modeling Language (UML) class definitions associated with the presentation layer.

The switch then identifies tables associated with the identified class definitions in the current database instance and the restoration database instance. The switch retrieves the attribute values stored in the identified tables, determines the differences among the attribute values. The differences include the attribute values of the configuration information that should be added to and removed from the current configuration to revert back to the switch snapshot. In some embodiments, the switch obtains from the presentation layer the interdependencies of the configuration information that should be added to or removed. Based on the respective interdependencies, the switch removes and adds the corresponding determined configuration information to the switch modules (e.g., ASIC chips of the switch). The switch also starts operating the restoration database instance as the current database instance. In other words, the configuration information of the restoration database instance becomes the current configuration information. In this way, the switch facilitates online switch snapshot restoration, thereby retaining the service of the switch during the restoration process.

In some embodiments, the switch is a member of a switch group. A switch in the switch group can be referred to as a member switch. A respective member switch of the switch group can be equipped with a persistent storage framework which stores the configuration information in a local persistent storage. Such a persistent storage can be an object relational database. The configuration information is loaded from this persistent storage to the switch modules (e.g., the application-specific integrated circuit (ASIC) chips of the switch). In this disclosure, the description in conjunction with FIGS. 1-5 is associated with persistent storage in the switch; the description in conjunction with FIGS. 6A-6B is associated with distributed configuration management in a switch group; and the description in conjunction with FIG. 7 and onward provides more details on online restoration of switch snapshots.

In some embodiments, the framework supports Model Driven Architecture (MDA), Object Oriented Programming (OOP), and/or Model/View/Controller (MVC) design patterns to facilitate modular development and operation of the units. The framework can also support class frameworks based on Unified Modeling Language (UML). Upon receiving class models (e.g., class name, attributes, and methods) and their relations based on UML, the framework automatically generates the corresponding code, thereby ensuring structure in the operational units of a switch. In some embodiments, the class models are expressed in YANG, which is a data modeling language used to model configuration and state data manipulated by the Network Configuration Protocol (NETCONF).

Since the units operate on the framework in a modular way, their associated attribute values can be stored in a persistent storage in a structured way. In some embodiments, the framework uses Object-Relational Mapping to store the attribute values of the units in a structured way in an object relational database. The framework allows different classes to be defined for a unit based on MDA, OOP, and/or MVC design patterns. The framework then seamlessly maps a respective class to a database table and vice-versa. Furthermore, the framework also seamlessly represents the relationships among the classes (e.g., an association or a composition) in the database. As a result, when a unit becomes operational on the switch, attribute values associated with a respective class in that unit is automatically loaded from the database. Moreover, if a class changes (e.g., a new attribute or a new relationship), the framework seamlessly incorporates that change into the database.

In some embodiments, the switch group can be a fabric switch. The switch can include one or more units which allow the switch to join and operate as a member switch of the fabric switch. These units can also run on the framework. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

It should also be noted that a fabric switch is distinct from a virtual local area network (VLAN). A fabric switch can accommodate a plurality of VLANs. A VLAN is typically identified by a VLAN tag. In contrast, the fabric switch is identified a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

The term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device hosting one or more virtual machines can be referred to as a host machine. In this disclosure, the terms "end device" and "host machine" are used interchangeably.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Network Architecture

FIG. 1A illustrates an exemplary network with persistent storage framework support, in accordance with an embodiment of the present invention. As illustrated in FIG. 1A, a network 100 includes switches 101, 102, 103, 104, and 105. An end device 112 is coupled to switch 102. In some embodiments, end device 112 is a host machine, hosting one or more virtual machines. End device 112 can include a hypervisor, which runs one or more virtual machines. End device 112 can be equipped with a Network Interface Card (NIC) with one or more ports. End device 112 couples to switch 102 via the ports of the NIC.

In some embodiments, network 100 is a TRILL network and a respective switch of network 100, such as switch 102, is a TRILL RBridge. Under such a scenario, communication among the switches in network 100 is based on the TRILL protocol. For example, upon receiving an Ethernet frame from end device 112, switch 102 encapsulates the received Ethernet frame in a TRILL header and forwards the TRILL packet. In some further embodiments, network 100 is an IP network and a respective switch of network 100, such as switch 102, is an IP-capable switch, which calculates and maintains a local IP routing table (e.g., a routing information base or RIB), and is capable of forwarding packets based on its IP addresses. Under such a scenario, communication among the switches in network 100 is based on IP. For example, upon receiving an Ethernet frame from end device 112, switch 102 encapsulates the received Ethernet frame in an IP header and forwards the IP packet.

In some embodiments, network 100 is a fabric switch (under such a scenario, network 100 can also be referred to as fabric switch 100). Fabric switch 100 is assigned with a fabric switch identifier. A respective member switch of fabric switch 100 is associated with that fabric switch identifier. This allows the member switch to indicate that it is a member of fabric switch 100. In some embodiments, whenever a new member switch joins fabric switch 100, the fabric switch identifier is automatically associated with that new member switch. Furthermore, a respective member switch of fabric switch 100 is assigned a switch identifier (e.g., an RBridge identifier, a Fibre Channel (FC) domain ID (identifier), or an IP address). This switch identifier identifies the member switch in fabric switch 100.

Switches in fabric switch 100 use edge ports to communicate with end devices (e.g., non-member switches) and inter-switch ports to communicate with other member switches. For example, switch 102 is coupled to end device 112 via an edge port and to switches 101, 103, 104, and 105 via inter-switch ports and one or more links. Data communication via an edge port can be based on Ethernet and via an inter-switch port can be based on the IP and/or TRILL protocol. It should be noted that control message exchange via inter-switch ports can be based on a different protocol (e.g., the IP or FC protocol).

A switch, such as switch 102, stores configuration information needed to operate switch 102 as an individual switch or as a member switch of fabric switch 100. Furthermore, switch 102 can participate in various services and operations, such as network virtualization (e.g., a virtual local area networks (VLAN)), switch partitioning, and link aggregations (e.g., a multi-chassis trunk). Furthermore, switch 102 operates on a plurality of network protocols of different network layers (e.g., Ethernet, TRILL, FC, and IP). As a result, switch 102 runs protocol daemons for each of these protocols. However, to incorporate the services and operations, the protocol daemons need to be directly modified, which can lead to conflicts and errors.

Furthermore, each of the operations, services, and the protocols is associated with one or more attributes. These attribute values (e.g., parameters) is typically applied to switch 102 when switch 102 powers up. As a result, these attribute values are stored in a persistent storage so that these values can be retrieved even when switch 102 is powered off or restarts. With existing technologies, switch 102 may store such attribute values in a local storage in an unstructured format (e.g., a string comprising the attribute values). During the boot up process, switch 102 reads and parses the attribute values in the unstructured format, and loads the attribute values into switch memory. Managing persistent storage in unstructured format is inefficient and requires runtime structuring.

To solve this problem, switch 102 is equipped with a persistent storage framework 120 which facilitates structured persistent storage to the attribute values associated with different operational units of switch 102 (e.g., modules and services of switch 102). It should be noted that other switches of network 100 can be equipped with a persistent storage framework and support persistent storage. In some embodiments, some switch of network 100 may not be equipped with a persistent storage framework. Different units of switch 102, each of which facilitates an aspect of switch 102's operations, operate on framework 120 in a structured and modular way. This allows a respective unit to be independently introduced to framework 120 in such a way that the unit can interoperate with other units (e.g., modules and services) of switch 102. Framework 120 supports MDA, OOP, and/or MVC design patterns to facilitate structured development and operation of the units in switch 102.

Since the units operate on framework 120 in a structured way, their associated attribute values can be stored in a persistent storage in a structured way. In some embodiments, framework 120 uses Object-Relational Mapping to store the attribute values of the units in a structured way in an object relational database. Framework 120 allows different classes to be defined for a unit during development based on MDA, OOP, and/or MVC design patterns. Framework 120 supports class models based on UML. In some embodiments, class models are expressed in YANG, which is a data modeling language used to model configuration and state data manipulated by NETCONF. Upon receiving class models (e.g., class name, attributes, and methods) and their relationships based on UML, framework 120 automatically generates the corresponding code, thereby ensuring structure in the operational units of switch 102.

Framework 120 seamlessly maps a respective class to a database table and vice-versa. Furthermore, framework 120 also seamlessly represents the relations among the classes (e.g., an association or a composition) in the database. As a result, when a unit becomes operational on switch 102 (e.g., when switch 102 powers up), attribute values associated with a respective class in that unit is automatically loaded from the database. Moreover, if a class changes (e.g., a new attribute or a new relationship), framework 120 seamlessly incorporates that change into the database.

Persistent Storage Framework

Figure 1B:
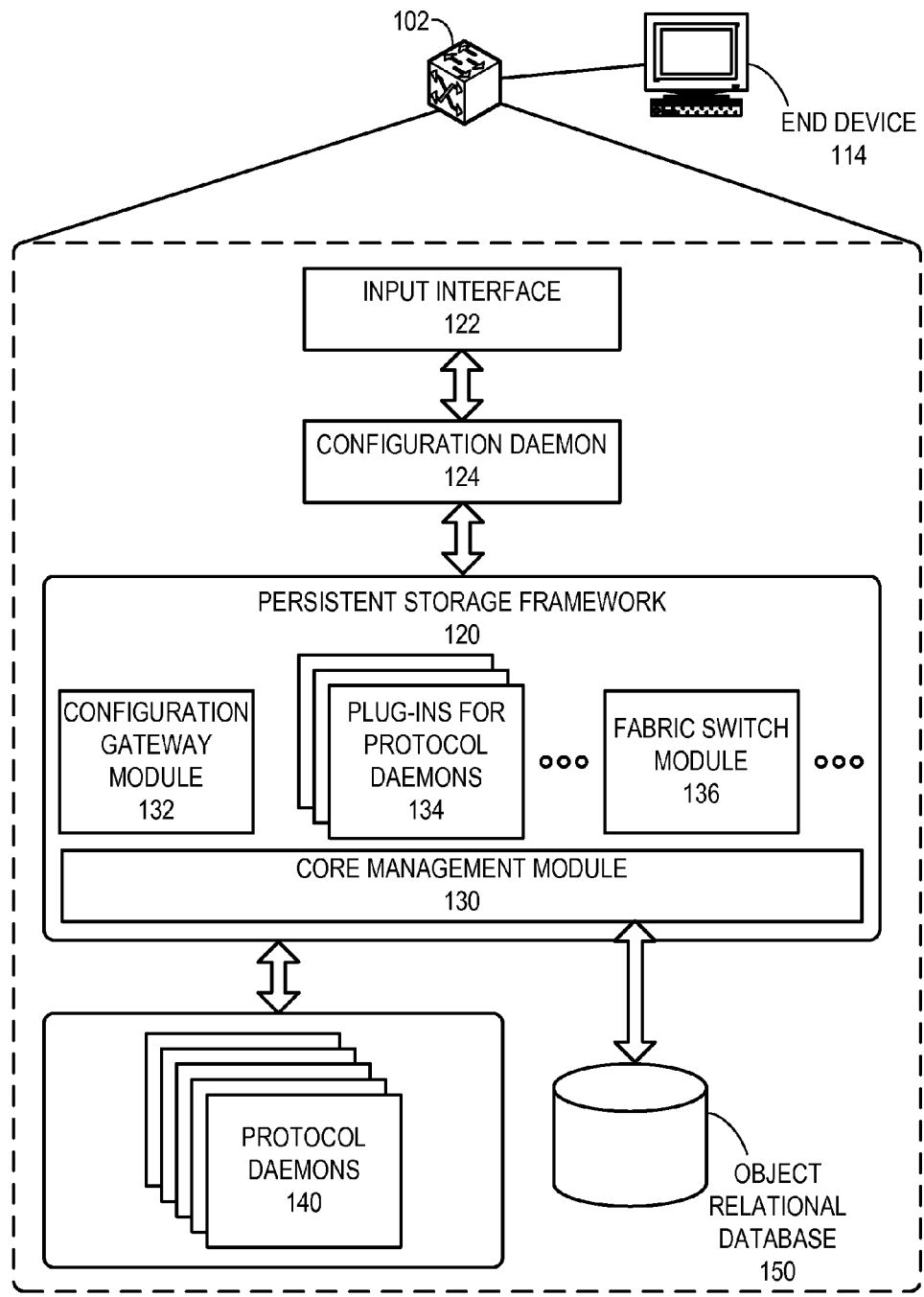
FIG. 1B illustrates an exemplary persistent storage framework support in a switch, in accordance with an embodiment of the present invention.

FIG. 1B illustrates an exemplary persistent storage framework in a switch, in accordance with an embodiment of the present invention. In this example, persistent storage framework 120 of switch 102 provides structured persistent storage to the operational units of switch 102. In some embodiments, switch 102 is coupled to an end device 114, which can operate as an administrative terminal for switch 102. Switch 102 runs one or more protocol daemons 140. For example, switch 102 can run respective protocol daemons for Ethernet, TRILL, FC, and IP. A protocol daemon facilitates the services and operations of a corresponding protocol for switch 102.

Switch 102 further includes an input interface 122 to switch 102 (e.g., a graphical user interface (GUI) and/or a command line interface (CLI). A user can access input interface 122 via end device 114. The user can obtain information from and provide instruction to switch 102 via input interface 122. Switch 102 also includes a configuration daemon 124, which can receive configuration (e.g., an IP address) for switch 102 from end device 114 (e.g., from a user) via input interface 122. Configuration daemon 124 provides this configuration information to framework 120. Framework 120 can include a configuration daemon gateway module 132, which communicates with configuration daemon 124. Upon receiving the configuration information, framework 120 can identify different attribute values (e.g., a VLAN identifier) and assigns those attribute values to the corresponding attribute of an operational unit of switch 102.

On the other hand, switch 102 can receive an instruction via input interface 122 to provide its configuration associated with one or more units. For example, a user can issue a command to show the IP addresses assigned to switch 102 from end device 114. Input interface 122 provides this instruction to configuration daemon 124, which in turn, sends an internal command to configuration daemon gateway module 132 for the requested configuration information. In response, framework 120 identifies the attributes (e.g., IP addresses) associated with the requested configuration information and obtains the corresponding attribute values (e.g., assigned IP addresses to switch 120) from a persistent storage. Configuration daemon gateway module 132 provides the obtained attribute values to configuration daemon 124. Upon receiving the attribute values, configuration daemon 124 provides the attribute values as the requested configuration information to input interface 122, which in turn, provides the configuration information to end device 114.

Framework 120 includes a core management module 130, which facilitates structured persistent storage to the attribute values associated with different operational units of switch 102 (e.g., modules and services of switch 102). Different units of switch 102 operate on core management module 130 in a structured way. This allows a respective unit to be independently introduced to framework 120 such a way that the unit can interoperate with other units (e.g., modules and services) of switch 102. Framework 120 supports MDA, OOP, and/or MVC design pattern to facilitate structured development and operation of the units in switch 102.

For example, instead of modifying protocol daemons 140, switch 102 can have plug-ins 134 for protocol daemons 140. Core management module 130 facilitates inter-operations between plug-in 134 and protocol daemons 140. Suppose that a modification to standard Ethernet protocol is needed. Instead of modifying the native protocol daemon of Ethernet, a plug-in for the protocol daemon of Ethernet can be introduced to core management module 130. Similarly, to facilitate membership to a fabric switch, fabric switch module 136 can be introduced to core management module 130. Fabric switch module 136 allows switch 102 to run a control plane with automatic configuration capability and join a fabric switch based on the control plane. Plug-ins 134 and fabric switch module 136 can be developed using MDA, OOP, and/or MVC design patterns, supported by framework 120.

Since the units of switch 102 operate core management module 130 in a structured way, their associated attribute values can be stored in a persistent storage in a structured way. In some embodiments, core management module 130 uses Object-Relational Mapping to store the attribute values of the units in a structured way in an object relational database 150. Core management module 130 allows different classes to be defined for a unit during development based on MDA, OOP, and/or MVC design patterns and expressed as a UML model, and seamlessly maps a respective class to a database table in database 150 and vice-versa.

Furthermore, core management module 130 also seamlessly represents the relations among the classes (e.g., an association or a composition) in database 150. As a result, when a unit becomes operational on switch 102 (e.g., when switch 102 powers up), attribute values associated with a respective class in that unit is automatically loaded from database 150. Moreover, if a class changes (e.g., a new attribute or a new relationship), core management module 130 seamlessly incorporates that change into database 150. It should be noted that a class defined by a user may not include explicit instructions (e.g., a Structured Query Language (SQL) query) for inserting and retrieving attribute values from database 150. The class simply includes an instruction indicating that persistent storage is required for some operations and core management module 130 facilitates the object relational mapping, and the corresponding database operations (e.g., SQL insert and select).

Attribute Data Types

To facilitate seamless object relational mapping, a persistent storage framework defines a set of data types for different categories of attributes. These attributes can be used to define class attributes of different operational units of a switch. In some embodiments, the framework can identify these class attributes expressed in a UML model. It should be noted that such expression can be represented in various forms, such as graphical, textual, XML, etc. The framework ensures these attributes are compatible with an object relational database. As a result, during operation, the framework can seamlessly map the class attributes to an object relational database and provide persistent storage to the attributes.

A data type of an attribute is basic entity provided by the framework that can be persisted or transported in the object relational database. A data type is associated with an identifier (e.g., a name). A data type can be, persisted or ephemeral, configuration or operational and read-only or read-write. The framework can serialize or de-serialize a data type to or from: XML, remote procedure call (RPC), SQL, JavaScript Object Notation (JSON), and Open vSwitch Database (OVSDB) management protocol.

The framework supports different categories of attributes. Such categories include, but are not limited to, integers and numbers, string, date and time, messaging, UML relations, network, and others. In addition, the framework supports user defined data types and corresponding attributes. Table 1 includes different categories of attributes and their corresponding data types supported by the framework. It should be noted that the categories and data types listed in Table 1 is not exhaustive. The framework can support more categories and data types.

TABLE 1

Data types supported by Persistent Storage Framework

| Category | Data Types |
|---|---|
| Integers and Numbers | 8-bit Unsigned Integer (UI8), 8-bit Signed Integer (SI8), UI16, SI16, UI32, SI32, UI64, SI64, 64-bit decimal (Decimal64) Vector variants of all of the above User-configured variants of all of the above UI32Range |
| String | String, StringVector, StringVectorVector, StringUC |
| Date and Time | Date, Time, DateTime Vector variants of all of the above and User-configured variants of all of the above |
| Messaging | ServiceId, ResourceId, ResourceEnum MessageType, MessagePriority, LocationId, SerializableObjectType |
| UML Relations | Association, Aggregation, Composition |
| Network | Universally Unique Identifier (UUID), World Wide Name (WWN), IPv4Address, IPv4AddressNetworkMask, IPv6Address, IPv6AddressNetworkMask, IPvXAddress, IPvXAddressNetworkMask, Uniform Resource Identifier (URI), MACAddress, MACAddress2, Host, SNMPObjectId (Simple Network Management Protocol (SNMP)) Vector variants of all of the above and User-configured variants of all of the above |
| SQL | SQLIn, SQLBetween, SQLComparator, SQLExists |
| Other | Union, Bool, BoolUC, BoolVector, SerializableObejct, SerializableObjectVector ManagedObject, ManagedObjectVector, Enumeration ObjectId, ObjectIdVector LargeObject, Map, XML |

The framework provides extensive list of built-in data types, as described in conjunction with Table 1. These data types capture the attribute values (e.g., data fields) of objects. In some embodiments, the framework includes one or more attributes that provide run time introspection that allows runtime identification of classes. Since attributes can be serialized to and de-serialized from a variety of formats, the framework provides extensive support for custom behavior overriding in serialization and de-serialization. Furthermore, the framework supports user defined data types.

Object Identifier

In the example in FIG. 1B, framework 120 stores attribute values of different classes in database 150. During operation, a class is instantiated in switch 102 (e.g., in the memory of switch 102), and one or more attributes of that instance are assigned corresponding values. For example, if the class represents a line card switch 102, an attribute can be a MAC address of a port in that line card (e.g., MACAddress data type). When the line card becomes active, an instance of the class, which can be referred to as an object, is created in the memory of switch 102, and framework 120 stores the attribute values of that object in a table associated with the class in database 150.

However, a switch can have a plurality of line cards. For another line card, another object (i.e., another instance) of the class is created in the memory of switch 102, and framework 120 stores the attribute values of that other object in the table associated with the class in database 150. In this way, the same table can store attribute values of different objects of the same class. To identify different objects of a class in the table, framework 120 generates and assigns an object identifier (object ID or OID) to a respective object of a respective class. This object identifier operates as the primary identifier of that object. In the database table, this primary identifier is the primary key of that table. It should be noted that an object identifier is referred to be associated with a class in a generic sense, which indicates an object identifier of an object of the class.

Figure 2:
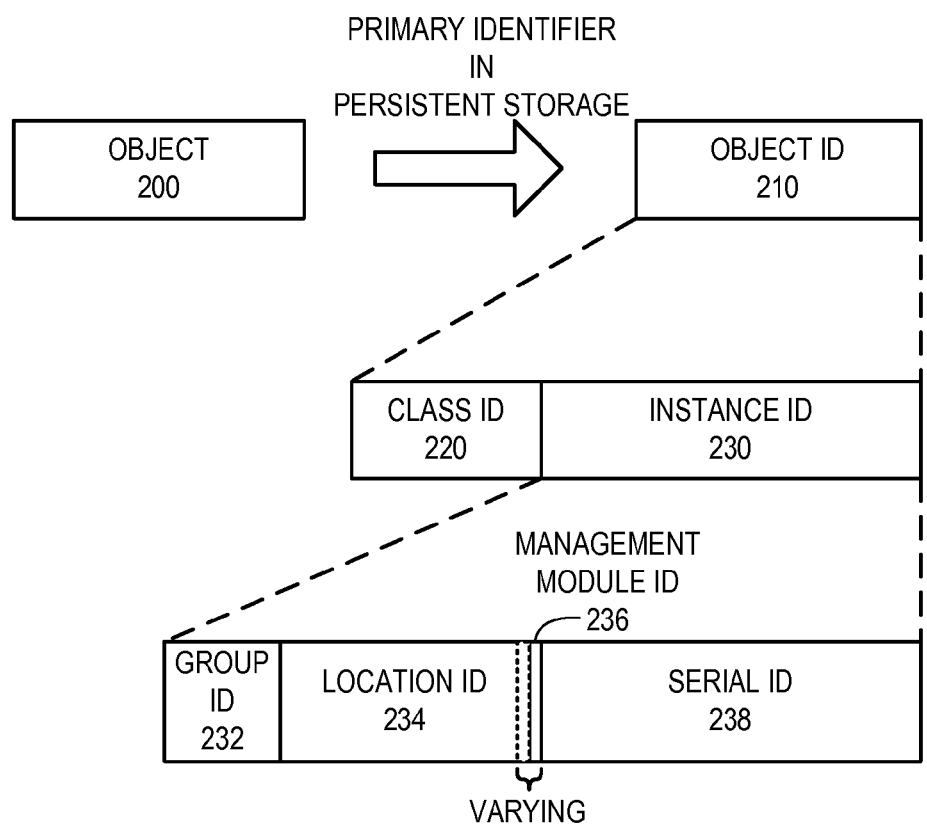
FIG. 2 illustrates an exemplary object identifier generated by a persistent storage framework in a switch, in accordance with an embodiment of the present invention.

FIG. 2 illustrates an exemplary object identifier generated by a persistent storage framework in a switch, in accordance with an embodiment of the present invention. During operation, an object 200 of a class is created in the memory of a switch. The persistent storage framework of the switch creates an object identifier 210 for object 200. This object identifier 210 can be the primary identifier for object 210 in the persistent storage. If the persistent storage is an object relational database, the database can include a table corresponding to the class. The attribute values of object 200 and object identifier 210 are inserted into the table. Object identifier 210 can be the primary key for that table.

In some embodiments, object identifier includes a class identifier (a class ID or CID) 220 and an instance identifier (an instance ID or IID) 230. Class identifier 220 represents the class from which the object is instantiated. In some embodiments, class identifier 220 is generated based on a hash function (e.g., Rabin Polynomial hash function) applied to the name of the class. Instance identifier 230 represents that particular instance of the object. Hence, if two objects of the same class are created, class identifier 220 of object identifier 210 remains the same for both the objects. However, the two objects differ in their respective instance identifier 230. Typically, class identifier 220 and instance identifier 230 are 32 and 64 bits long, respectively. However, these lengths can vary.

In some embodiments, instance identifier 230 includes a group identifier 232, a location identifier 234, a management module identifier 236, and a serial identifier 238. Group identifier 232 identifies a group in which the switch is a member. For example, if the switch is a member switch of a fabric switch, group identifier 232 can be a fabric switch identifier, which identifies a fabric switch. Location identifier 234 identifies the switch in the group. For example, if the switch is a member switch of a fabric switch, location identifier 234 can be a switch identifier, which identifies the switch within that fabric switch. Typically, group identifier 232 and location identifier 234 are 10 and 20 bits long, respectively.

Management module identifier 236 identifies the type of management module is operating the switch. For example, if the switch is participating in an active-standby high availability protocol (e.g., Virtual Router Redundancy Protocol (VRRP) and Virtual Switch Redundancy Protocol (VSRP)), management module identifier 236 can indicate whether the switch is an active or a standby switch. Typically, management module identifier 236 is 1 bit long. However, length of management module identifier 236 can be increased by incorporating adjacent bits from location identifier 234.

Serial identifier 238 provides identification of a specific instance of an object and can be a wrapped-around monotonically increasing number (e.g., an unsigned integer). Typically, serial identifier 238 is 32 bits long. In this way, object identifier 210 uniquely identifies an object of a class created by a management module in a switch, which can be in a fabric switch. In other words, object identifier 210 can be unique among objects, classes, management modules, fabric switches, and switch locations within a corresponding fabric switch.

Base Classes

In the example in FIG. 1B, persistent storage framework 120 maps classes to object relational tables in database 150, and inserts attribute values of an object of the class into the table. Framework 120 provides a set of base classes from which a class created for an operational unit of switch 102 can be inherited from. These base classes provide a development framework for the operational units and ensure that the operational units of switch 102 remain structured during operation. In this way, framework 120 can facilitate structured persistent storage to the attribute values of the operational units.

Figure 3:
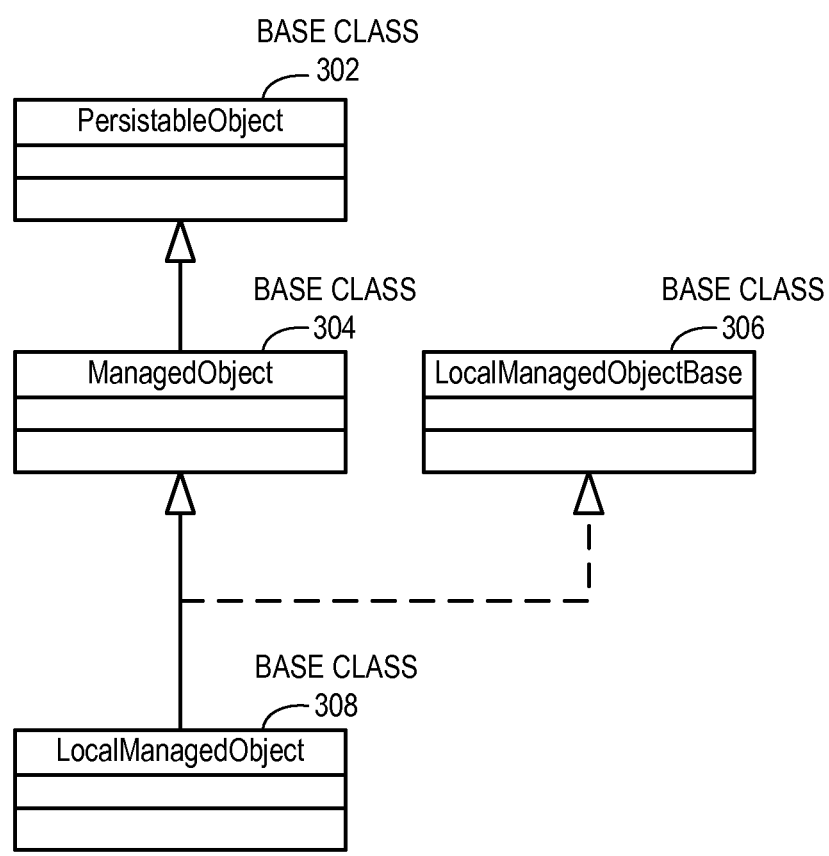
FIG. 3 illustrates exemplary base classes for supporting a persistent storage framework in a switch, in accordance with an embodiment of the present invention.

The framework supports a set of base classes and multiple inheritance from these base classes. FIG. 3 illustrates exemplary base classes for supporting a persistent storage framework in a switch, in accordance with an embodiment of the present invention. In some embodiments, the most base class 302 is the PersistableObject class. This class outlines the most fundamental operations supported by the persistent storage framework of a switch. Another base class 304, denoted as the ManagedObject class, is virtually derived from the PersistableObject class. Any object instantiated from an inheritance chain of the ManagedObject class can be referred to as a managed object. The framework provides seamless persistent storage support to these managed objects.

Class 304 outlines the most common attributes and operations of the objects managed by the framework. In other words, all class hierarchies derive virtually from the PersistableObject class. Since a class can inherit from multiple classes and each of these classes can inherit from the PersistableObject class, there can potentially be a conflict during execution of a managed object. This problem is generally referred to as the diamond problem. To solve this problem, the framework supports virtual derivation from the PersistableObject class. Another base class 306, denoted as the LocalManagedObjectBase class, outlines the attributes and operations locally managed within a switch. For example, a port is locally managed in a switch.

Base class 308, denoted as the LocalManagedObject class, is virtually derived from the ManagedObject class and the ManagedObjectBase class. Hence, the LocalManagedObject class outlines the attributes and operations of a switch which are locally and globally managed. For example, a port is locally managed within a switch and a VLAN configured for the port is managed globally. In some embodiments, an application (e.g., a protocol plug-in) running on a switch can specify more base classes for that application. Typically, base classes are not directly mapped to the tables of the object relational database. These base classes provide object relational mapping support. The attributes (i.e., the data fields) of these classes become part of a respective managed object derived from these base classes. As a result, the managed objects can share states and behavior.

In some embodiments, the attributes of a managed object can be any of the attribute data types supported by the framework, as described in conjunction with Table 1. The framework also supports vector variants (e.g., arrays and lists) for a number of the data types. Furthermore, the framework provides support to check whether a particular attribute is user configured. As described in conjunction with FIG. 3, the framework supports hierarchical managed objects based on inheritance. The framework also supports weak and strong references to objects. A weak reference does not protect the referenced object from being destroyed (e.g., by a garbage collector), unlike a strong reference, which protects the object from being destroyed.

Object Relational Mapping

In some embodiments, a persistent storage framework of a switch supports, both one-to-one and one-to-many, association, aggregation, and composition UML relationships. Association and aggregation are supported via ObjectID and ObjectIDVector data types, and ObjectIDAssociation and ObjectIDAssociationVector attributes, respectively. On the other hand, composition is supported via ManagedObectPointer and ManagedObectPointerVector data types and corresponding attributes. In some embodiments, the framework supports smart pointers and vector to facilitate seamless development.

Figure 4A:
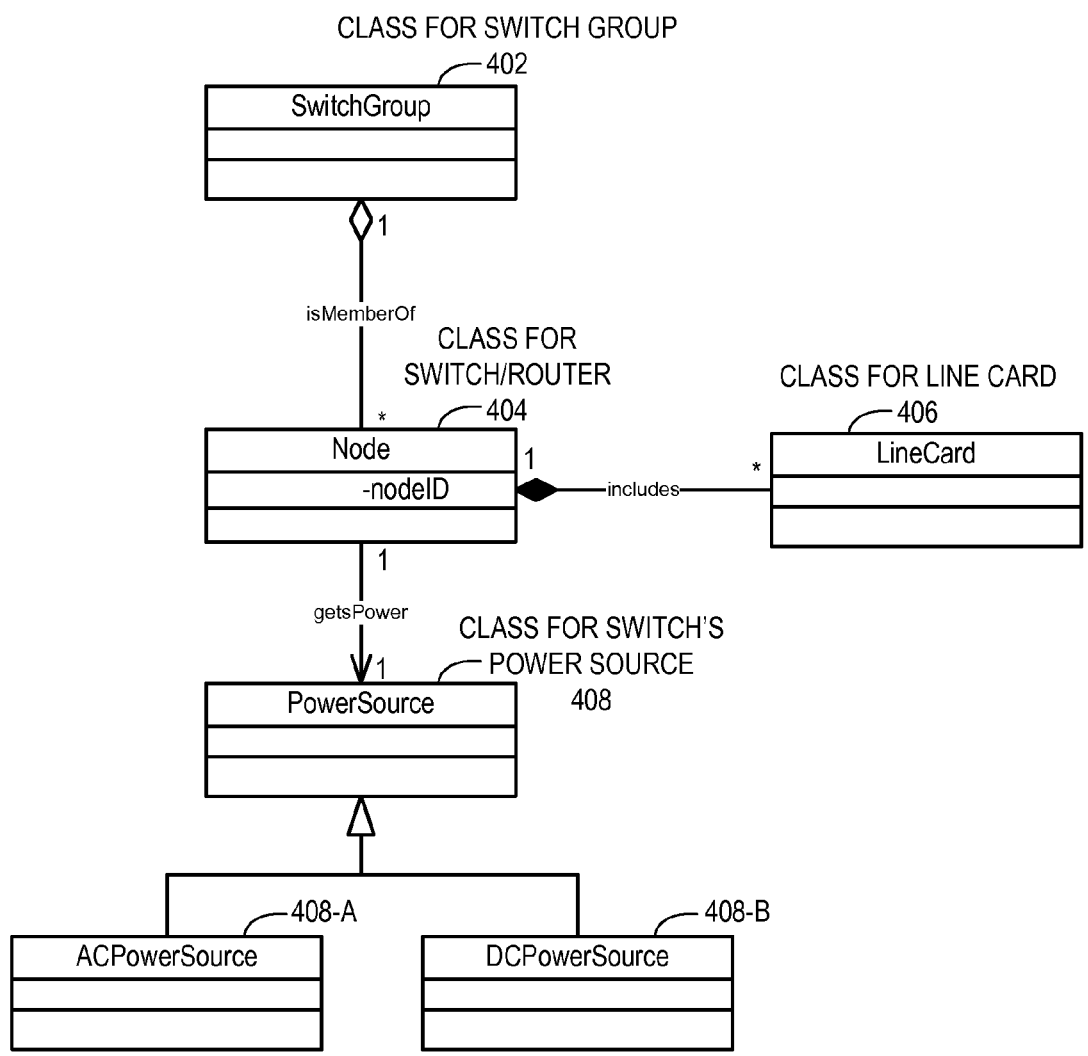
FIG. 4A illustrates an exemplary Unified Modeling Language (UML) model of classes of a switch with a persistent storage framework, in accordance with an embodiment of the present invention.

FIG. 4A illustrates an exemplary UML model of classes of a switch with a persistent storage framework, in accordance with an embodiment of the present invention. In this example, a class 404, denoted as the Node class, represents network nodes, such as a switch or a router. Attributes for the Node class includes a NodeID, which represents an identifier for a node. Since a switch can be a member of a switch group (e.g., a fabric switch), the Node class has a relationship with class 402, denoted as the SwitchGroup class, which represents a group of switches. A switch can be in one such switch group and a switch group aggregates a plurality of switches. Hence, the relationship between the Node class and the SwitchGroup class is a one-to-many aggregation, which is denoted as "isMemberOf." In this relationship, the SwitchGroup class can be referred to as the container class since a switch group "contains" a switch. On the other hand, the Node class can be referred to as a related class.

Similarly, a switch can include one or more line cards. Hence, the Node class has a relationship with class 406, denoted as the LineCard class, which represents a line card. A line card can be in one switch and a switch includes (i.e., is composed of) a plurality of line cards. Hence, the relationship between the Node class and the LineCard class is a one-to-many composition, which is denoted as "includes." On the other hand, a switch typically has a power source, which may not be inside of the switch. So, the Node class has a relationship with class 408, denoted as the PowerSource class, which represents a power source of a node. Suppose that, at a time, a power source can power one switch and a switch can receive power from one source. Hence, the relationship between the Node class and the PowerSource class is a one-to-one association, which is denoted as "getsPower."

A power source can be based on alternating current (AC) or direct current (DC). So, class 408-A, denoted as the ACPowerSource class, and class 408-B, denoted as the DCPowerSource class, are derived from the PowerSource class. The ACPowerSource class and the DCPowerSource class represent AC and DC power sources, respectively. Hence, based on the getsPower association, a Node can get power from a generic power source, an AC power source, or a DC power source. In this UML diagram, since the relationship between the Node class and class 408 is one-to-one, an object of the Node class can have only one of the power sources. In this example, the PowerSource class, the ACPowerSource class, and the DCPowerSource class can be referred to as the inheritance chain of the PowerSource class (class 408).

The framework can receive the UML diagram of FIG. 4A and generate the corresponding classes in a supported programming language (e.g., C++, Java, C#, etc). Furthermore, the framework generates an object relational table for the classes in the model. Furthermore, the framework can generate corresponding auxiliary tables to represent one-to-many relationships, as well as tables for classes in an inheritance chain (e.g., class derivations) and for their corresponding instances (i.e., objects), as described in conjunction with FIGS. 4C and 4D. In some embodiments, the framework receives XML representation of classes and their relationship (e.g., from a user), and generates the corresponding classes and tables. FIG. 4B illustrates an exemplary XML representation of a class corresponding to a switch with a persistent storage framework, in accordance with an embodiment of the present invention. In this example, XML definition 400 represents the Node class (class 404 of the UML model in FIG. 4A). XML definition 400 represents class Node as a ManagedObject with name "Node."

XML definition 400 includes a respective attribute, such as NodeID, and its type (i.e., data type, as described in conjunction with Table 1). XML definition 400 also includes one-to-one and one-to-many relationships for which the Node class is a container class. For example, a node contains line cards. Hence, XML definition 400 specifies aggregation "includes" as an attribute, its type, and the class to which Node is related. It should be noted that the isMemberOf relationship is not represented in XML definition 400 even though the isMemberOf relationship to the Node class. This is because the container class for the isMemberOf relationship is the SwitchGroup class. Hence, the isMemberOf relationship is represented in an XML definition corresponding to the SwitchGroup class (not shown in FIG. 4B).

Persistent Storage in a Switch

Figure 4C:
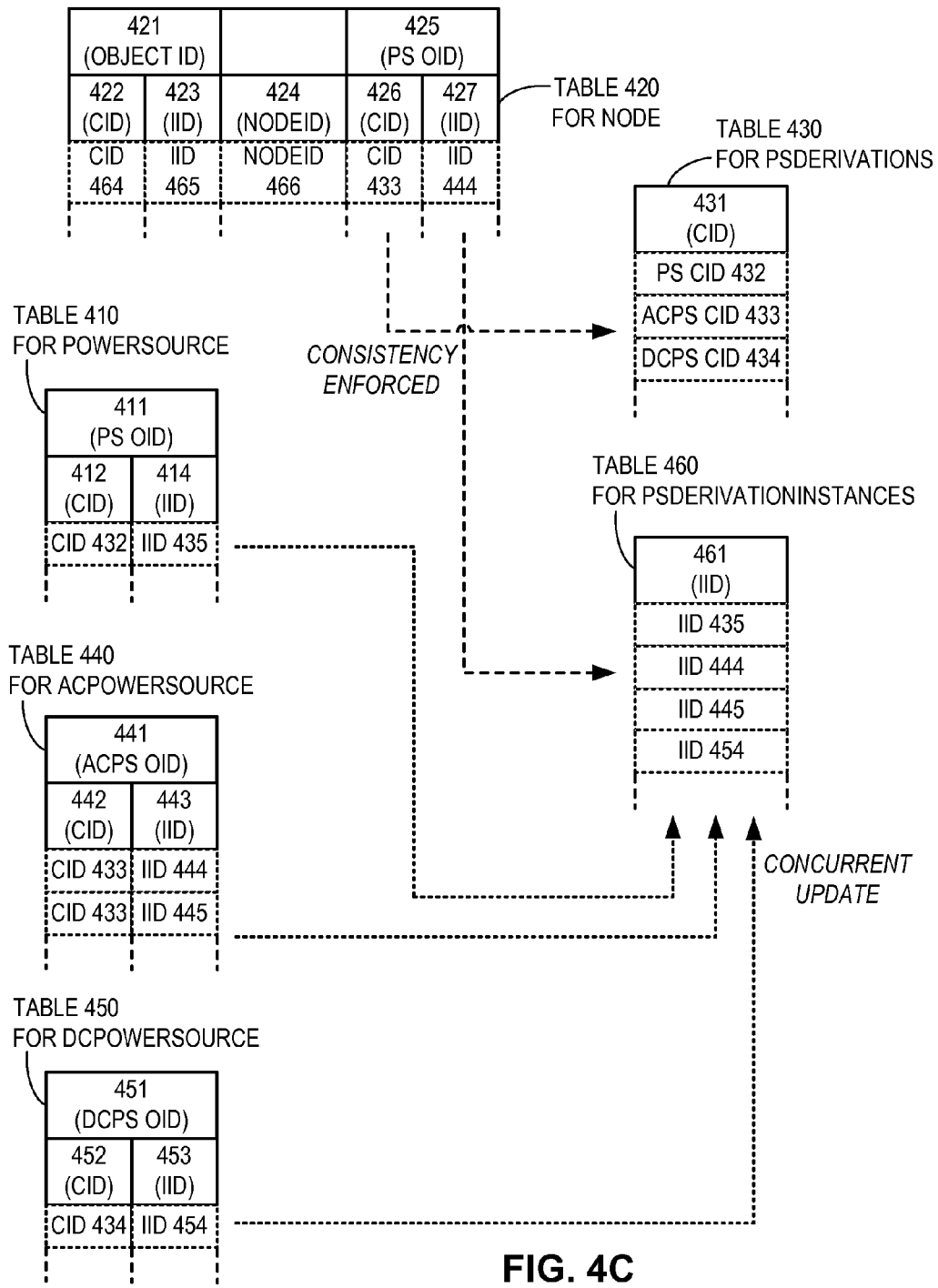
FIG. 4C illustrates exemplary tables generated by a persistent storage framework in a switch, in accordance with an embodiment of the present invention.

Upon receiving XML definitions associated with the classes of a UML model, the framework creates a respective table for a respective class, their derivations, their instances (i.e., objects), and their one-to-many relationships in an object relational database. FIG. 4C illustrates exemplary tables generated by a persistent storage framework in a switch, in accordance with an embodiment of the present invention. During operation, the persistent storage framework of the switch generates a table 420 for the Node class in an object relational database. Table 420 includes a column 421 for an object identifier associated with the Node class. Column 421 includes two columns 422 and 423 for class identifier and instance identifier, respectively, of the object identifier associated with the Node class.

Table 420 also includes a column for a respective attribute of the Node class. For example, table 420 includes a column 424 for a NodeID of the Node class. Furthermore, since the Node class has a one-to-one association with the PowerSource class, for which the Node class is the container class, the framework includes a column 425 for an object identifier of an object of the PowerSource class (i.e., an object associated with the PowerSource class). Column 425 includes two columns 426 and 427 for the class identifier and instance identifier, respectively, of the object identifier associated with the PowerSource class. The framework also creates a table 410 for the PowerSource class, comprising column 411 for the object identifier associated with the PowerSource class. Column 411 includes two columns 412 and 413 for the class identifier and instance identifier, respectively, of the object identifier of the PowerSource class.

Similarly, the framework also creates a table 440 for the ACPowerSource class, comprising column 441 for an object identifier of an object of the ACPowerSource class (i.e., an object associated with the ACPowerSource class). Column 441 includes two columns 442 and 443 for the class identifier and instance identifier, respectively, of the object identifier associated with the ACPowerSource class. In the same way, the framework also creates a table 450 for the DCPowerSource class, comprising column 451 for an object identifier of an object of the PowerSource class. Column 451 includes two columns 452 and 453 for the class identifier and instance identifier, respectively, of the object identifier associated with the DCPowerSource class.

In some embodiments, the framework creates auxiliary tables to enforce consistency on columns 426 and 427. For example, the framework creates an auxiliary table 430 for the derivations of the PowerSource class (e.g., based on the UML model in FIG. 4A). In this example, table 430 corresponds to the PowerSource, ACPowerSource, and DCPowerSource classes. Table 430 includes a column 431 for the class identifier associated with the derivations of the PowerSource class. Similarly, the framework creates an auxiliary table 460 for the objects instantiated from the derivations of the PowerSource class. In this example, table 460 corresponds to the PowerSource, ACPowerSource, and DCPowerSource classes. Table 460 includes a column 461 for the instance identifiers of the objects instantiated from the derivations of the PowerSource class.

When a class identifier is generated for any class of the inheritance chain of the PowerSource class, that class identifier is inserted into table 430. The framework identifies the PowerSource, the ACPowerSource, and the DCPowerSource classes of the inheritance chain of the PowerSource class from the UML model in FIG. 4A and generates class identifiers 432, 433, and 434, respectively. The framework then inserts class identifiers 432, 433, and 434 into table 430. In this example, an entry in a table is denoted with dotted lines. Column 431 of table 430 provides consistency enforcement to column 426 of table 420 (denoted with a dashed arrow). In some embodiments, consistency enforcement of column 426 is based on a foreign key constraint on column 431 of table 430. On the other hand, when the framework identifies an object of the PowerSource, ACPowerSource, or the DCPowerSource class, the framework generates a corresponding object identifier and inserts the object identifier into table 410, 440, or 450, respectively.

When an object identifier is inserted into table 410, 440, or 450, the instance identifier of the object identifier is concurrently inserted into table 460 (denoted with dotted arrow). Suppose that, upon detecting an object in the memory of the switch, the framework inserts an object identifier comprising a class identifier 432 and instance identifier 435 into table 410. Similarly, an object identifier comprising a class identifier 433 and instance identifier 444, and an object identifier comprising a class identifier 433 and instance identifier 445 are inserted into table 440. An object identifier comprising a class identifier 434 and instance identifier 454 is inserted into table 450. The framework ensures that instance identifiers 435, 444, 445, and 454 are also inserted into table 460. Column 461 of table 460 provides consistency enforcement to column 426 of table 420 (denoted with a dashed arrow). In some embodiments, consistency enforcement to column 427 is based on a foreign key constraint on column 461 of table 460.

During operation, an object of the Node class is instantiated in the memory of the switch. The framework identifies the object in the memory and generates an object identifier for the object comprising a class identifier 464 and an instance identifier 465. The framework identifies the attribute values of the object, which includes NodeID 466 and an object identifier of a power source object. Suppose that the power source for the switch is an AC power source, and the object identifier comprises a class identifier 433 and an instance identifier 444, as stored in table 440 corresponding to the ACPowerSource class. The framework creates an entry in table 420 by inserting class identifier 464, instance identifier 465, NodeID 466, class identifier 433, and instance identifier 444 into table 420. Since consistency is enforced on columns 426 and 427, the relational database ensures that class identifier 433 and instance identifier 444 appear in columns 431 and 461, respectively.

Figure 4D:
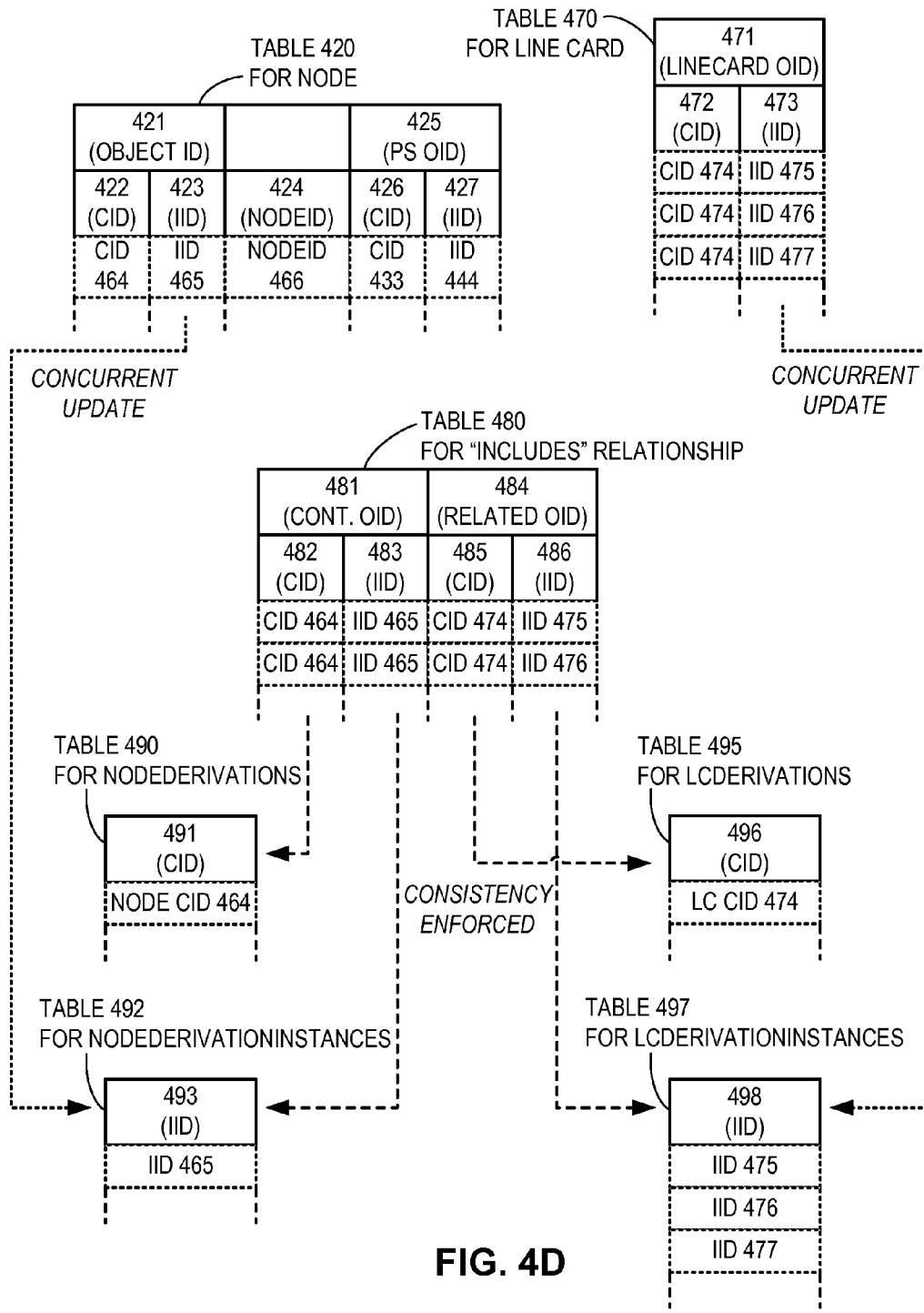
FIG. 4D illustrates an exemplary table representing a one-to-many association, which is generated by in a persistent storage framework in a switch, in accordance with an embodiment of the present invention.

However, even though the Node class is related to the LineCard class, since it is a one-to-many relationship, table 420 does not include an object identifier associated with the LineCard class. The framework creates an auxiliary table to represent the relationship the Node class and the LineCard class. FIG. 4D illustrates an exemplary table representing a one-to-many association, which is generated by a persistent storage framework in a switch, in accordance with an embodiment of the present invention. Upon detecting the LineCard class in the UML model in FIG. 4A, the persistent storage framework of the switch generates a table 470 for the LineCard class in an object relational database. Table 470 includes a column 471 for an object identifier associated with the LineCard class. Column 471 includes two columns 472 and 473 for corresponding class identifier and instance identifier, respectively, of the object identifier associated with the LineCard class.

During operation, an object of the LineCard class is instantiated in the memory of the switch. The framework identifies the object in memory and generates an object identifier comprising a class identifier 474 and an instance identifier 475 for the object. The framework then creates an entry in table 470 by inserting the object identifier into table 470. Similarly, the framework generates an object identifier comprising a class identifier 474 and an instance identifier 476 for another object of the LineCard class, and a third object identifier comprising a class identifier 474 and an instance identifier 477 for an object of the LineCard class. The framework creates respective entries in table 470 by inserting these object identifiers into table 470.

In some embodiments, the framework creates an auxiliary table 480 to represent the one-to-many "includes" relationship between the Node class and the LineCard class. In the relationship, the Node class is the container class and the LineCard class is the related class. Table 480 includes a column 481 for an object identifier associated with the Node class, and a column 484 for an object identifier associated with the LineCard class. Column 481 includes two columns 482 and 483 for the class identifier and instance identifier, respectively, of the object identifier associated with the Node class. Similarly, column 484 includes two columns 485 and 486 for the class identifier and instance identifier, respectively, of the object identifier associated with the LineCard class.

Suppose that the object of the Node class, which is associated with class identifier 464 and instance identifier 465, includes two line cards. Hence, the object of the Node class include two objects (e.g., an ManagedObjectVector) of the LineCard class. Suppose that instance identifiers 475 and 476 belong to these two objects. As a result, the framework inserts class identifier 464, instance identifier 465, class identifier 474, and instance identifier 475 into table 480. The framework also inserts class identifier 464, instance identifier 465, class identifier 474, and instance identifier 476 into table 480. In this way, the relationship between the object of the Node class (associated with instance identifier 465) and two objects of the LineCard class (associated with instance identifier 475 and 476) is stored in table 480.

In some embodiments, similar to tables 430 and 460, the framework creates auxiliary table 490 for the derivations of the Node class (e.g., based on the UML model in FIG. 4A). In this example, table 490 corresponds to the Node class (and its derivations, if any). Table 490 includes a column 491 for the class identifier associated with the derivations of the Node class. Similarly, the framework creates an auxiliary table 492 for the objects instantiated from the derivations of the Node class. In this example, table 492 corresponds to the Node class (and its derivations, if any). Table 492 includes a column 493 for the instance identifiers of the objects instantiated from the derivations of the Node class.

In the same way, the framework creates auxiliary table 495 for the derivations of the LineCard class (and its derivations, if any). Table 495 includes a column 496 for the class identifier associated with the derivations of the LineCard class. Similarly, the framework creates an auxiliary table 497 for the objects instantiated from the derivations of the LineCard class. In this example, table 497 corresponds to the LineCard class (and its derivations, if any). Table 497 includes a column 498 for the instance identifiers of the objects instantiated from the derivations of the LineCard class.

When a class identifier is generated for the Node class or the LineCard class, that class identifier is inserted into table 490 or 495, respectively. The framework inserts class identifiers 464 and 474 associated with the Node and the LineCard classes, respectively, into tables 490 and 495, respectively. In this example, an entry in a table is denoted with dotted lines. Column 491 of table 490 provides consistency enforcement to column 482 of table 480 (denoted with a dashed arrow). In some embodiments, consistency enforcement of column 482 is based on a foreign key constraint on column 491 of table 490. In the same way, column 496 of table 495 provides consistency enforcement to column 485 of table 480 (denoted with a dashed arrow). In some embodiments, consistency enforcement of column 485 is based on a foreign key constraint on column 496 of table 495.

On the other hand, when the framework identifies objects of the Node or the LineCard class, the framework generates a corresponding object identifier and inserts the object identifier, comprising a class identifier and an instance identifier, into table 420 or 470, respectively. When an object identifier is inserted into table 420 or 470, the instance identifier of the object identifier is concurrently inserted into table 492 or 497, respectively (denoted with dotted arrow). For example, when the framework inserts an object identifier comprising a class identifier 464 and instance identifier 465 into table 420, instance identifier 465 is inserted into table 492. In the same way, when the framework inserts an object identifier comprising a class identifier 474 and instance identifier 475 into table 470, instance identifier 475 is inserted into table 497.

Similar to table 480, the framework also creates an auxiliary table to represent the one-to-many "isMemberOf" relationship between the Node class and the SwitchGroup class, as described in conjunction with FIG. 4A. That table includes a column for an object identifier associated with the container class, which is the SwitchGroup class, and a column for an object identifier associated with the related class, which is the Node class. The column for the object identifier associated with the SwitchGroup class includes two columns corresponding to class identifier and instance identifier, respectively, of the object identifier. Similarly, the column for the object identifier associated with the Node class includes two columns corresponding to class identifier and instance identifier, respectively, of the object identifier.

It should be noted that the framework distinguishes between a composition relationship (e.g., "includes" in FIG. 4A) and an aggregation relation (e.g., "isMemberOf" in FIG. 4A). In some embodiments, for a composition relationship, the class definition of the container class includes an attribute of data type ManagedObject (and/or ManagedObject- Pointer), as described in conjunction with Table 1. In this disclosure, the phrases "class" and "class definition" are used interchangeably. If the relationship is one-to-many, the date type can be ManagedObjectVector (and/or ManagedObjectPointerVector). In this way, when an object of the container class is instantiated, the related objects are created and included in that instantiated object of the container class. On the other hand, for an aggregation relationship, the class definition of the container class includes an attribute of data type ObjectId. If the relationship is one-to-many, the date type can be ObjectIdVector. In this way, the objects are created separately, and when an object of the container class is instantiated, only references to those related objects are included in that instantiated object of the container class.

Operations of a Persistent Storage Framework

Figure 5A:
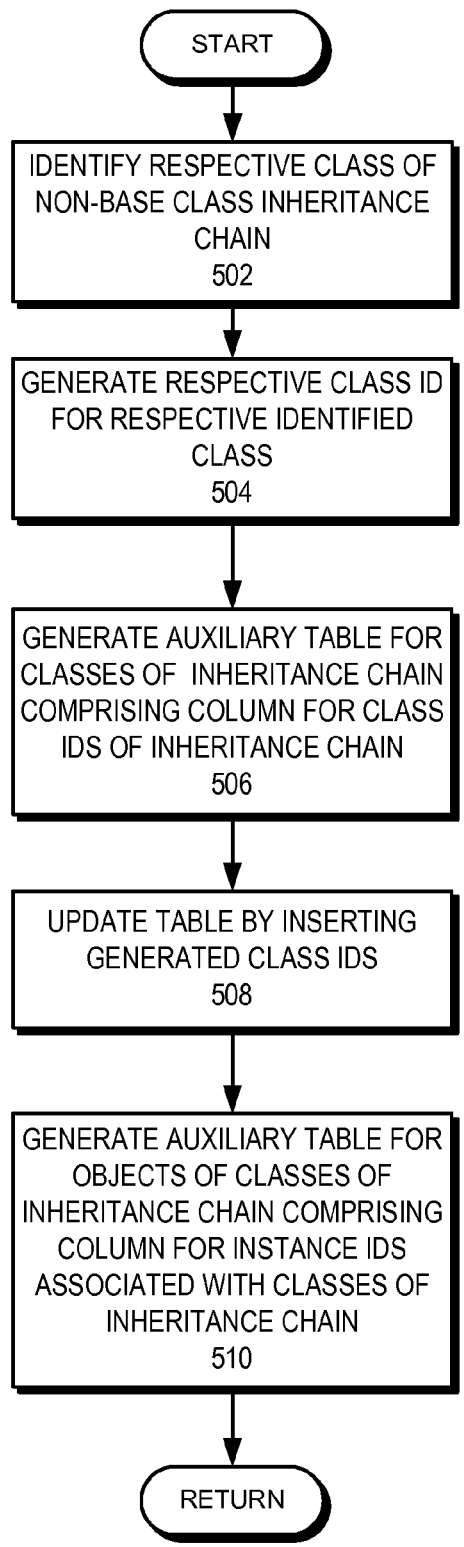
FIG. 5A presents a flowchart illustrating the process of a persistent storage framework of a switch generating auxiliary tables for an inheritance chain in a persistent storage, in accordance with an embodiment of the present invention.
Figure 6A:
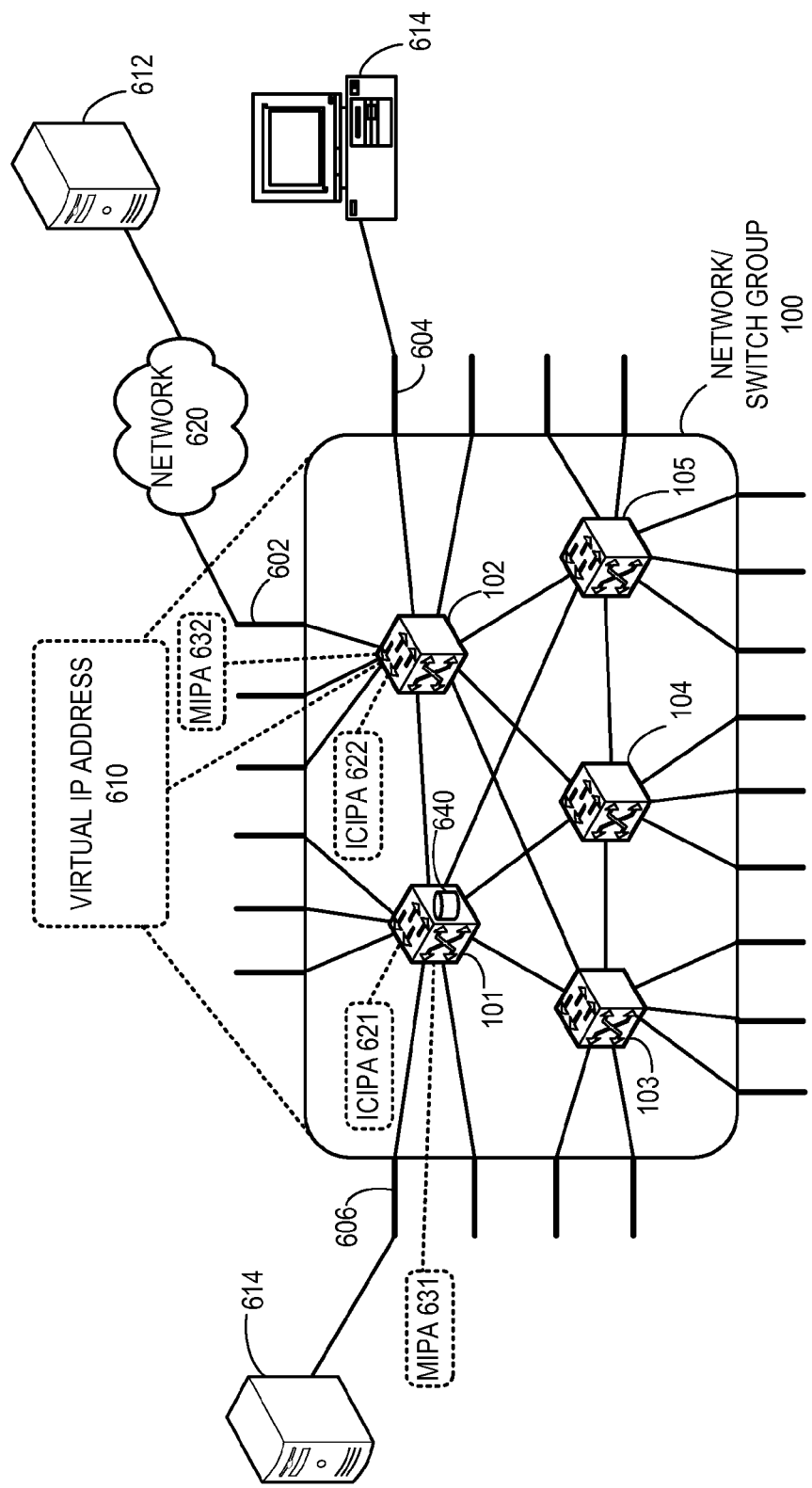
FIG. 6A illustrates an exemplary network with persistent storage framework and distributed configuration management support, in accordance with an embodiment of the present invention.
Figure 6B:
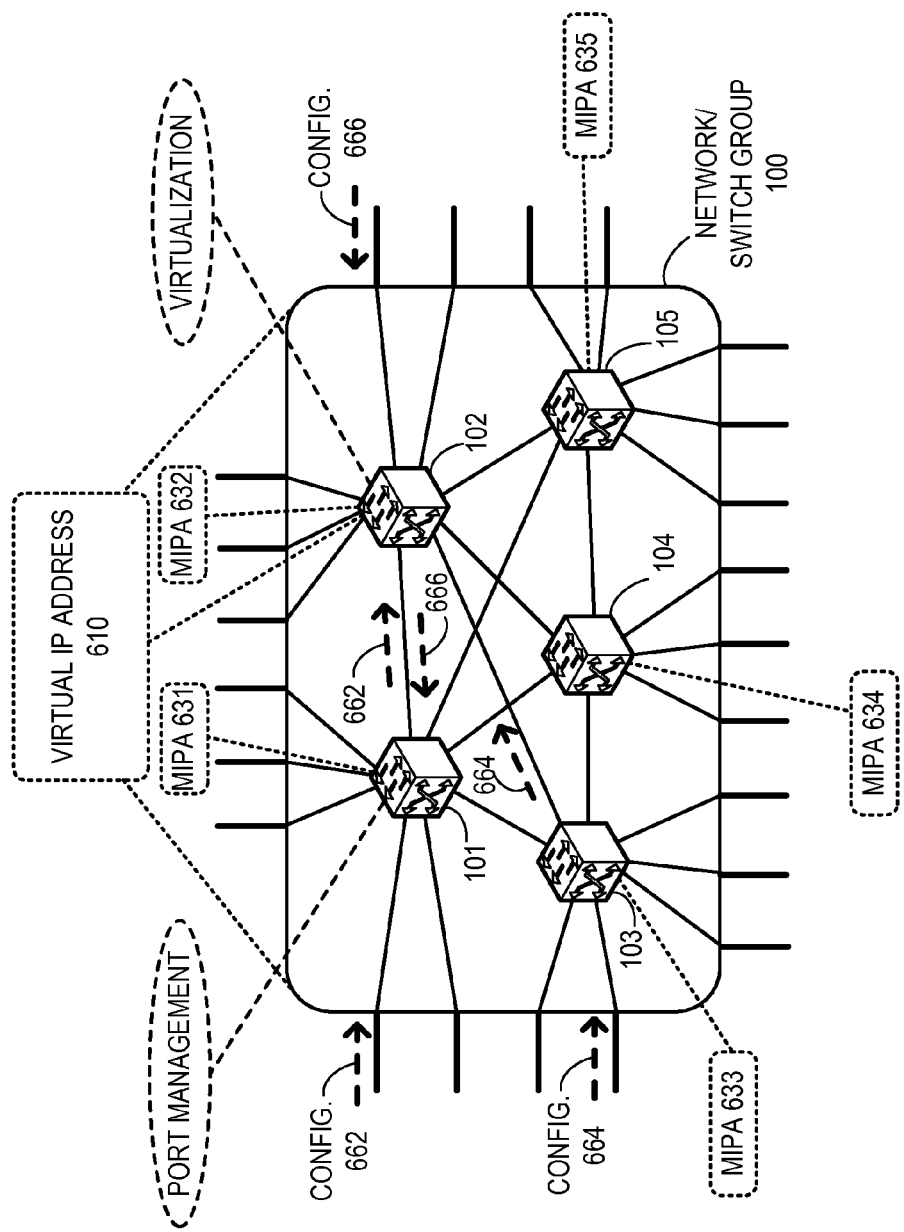
FIG. 6B illustrates an exemplary switch group with multi-input and multi-principal switch support, in accordance with an embodiment of the present invention.

FIG. 5A presents a flowchart illustrating the process of a persistent storage framework of a switch generating auxiliary tables for an inheritance chain in a structured persistent storage, in accordance with an embodiment of the present invention. During operation, the framework identifies a respective class of a non-base class inheritance chain (operation 502). The framework generates a respective class identifier for a respective identified class (operation 504). The framework generates an auxiliary table for the classes of the inheritance chain comprising a column for the class identifiers of the inheritance chain (operation 506) and updates the table for the classes of the inheritance chain by inserting the generated class identifiers (operation 508). The framework also generates an auxiliary table for the objects (i.e., the instantiated objects) of the classes of the inheritance chain, each comprising a column corresponding to the instance identifiers associated with the classes of the inheritance chain (operation 510).

Figure 5B:
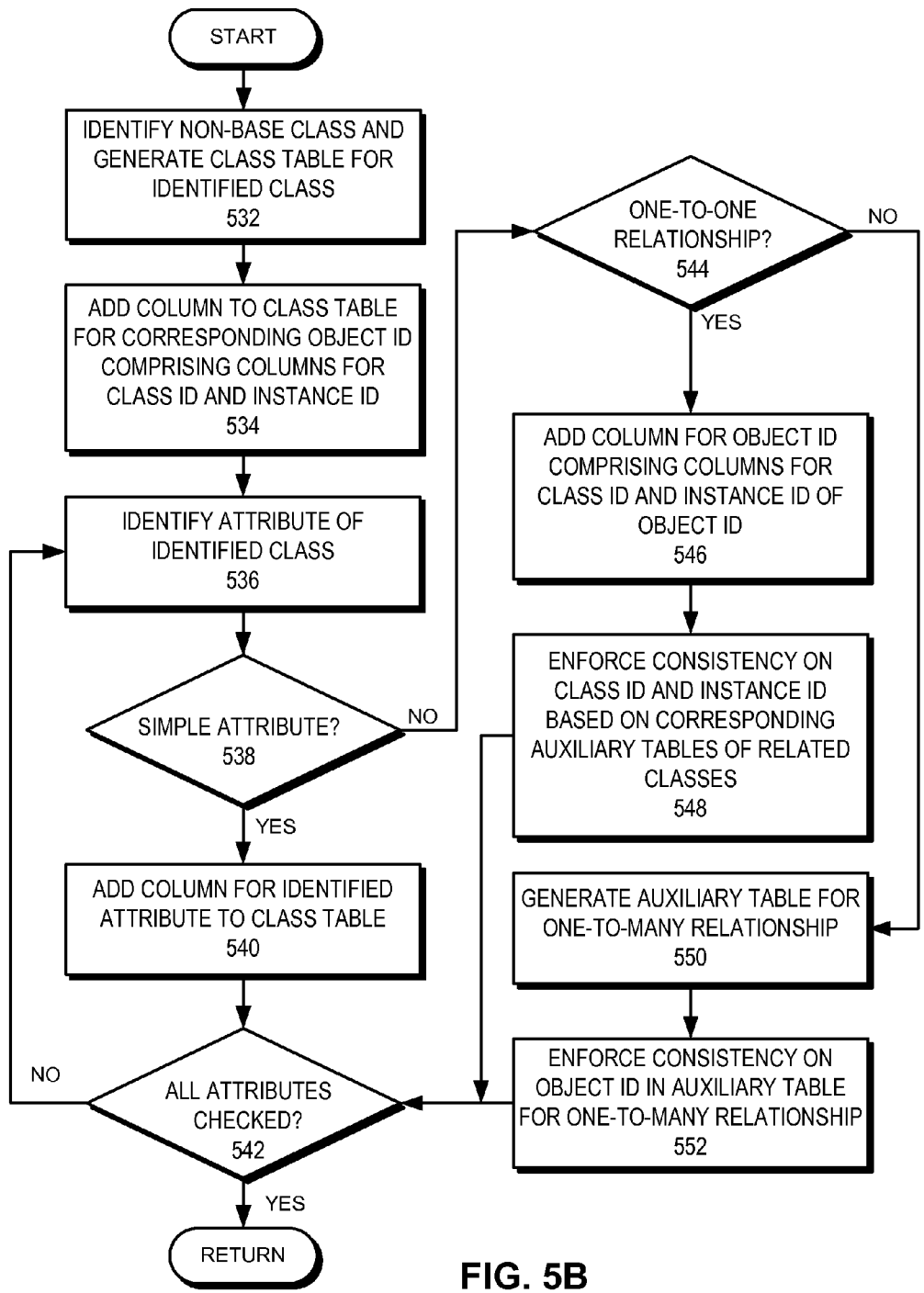
FIG. 5B presents a flowchart illustrating the process of a persistent storage framework of a switch generating class tables in a persistent storage, in accordance with an embodiment of the present invention.

FIG. 5B presents a flowchart illustrating the process of a persistent storage framework of a switch generating class tables in a structured persistent storage, in accordance with an embodiment of the present invention. During operation, the framework identifies a non-base class and generates a class table for the identified class (operation 532). In some embodiments, the framework identifies the class, and the attributes and operations (e.g., data members and methods) of the class from a class model (e.g., a UML model). The framework can receive the UML model from a graphical or textual input (e.g., a GUI, CLI, or XML file). In some embodiments, the table is named based on a hash function (e.g., a Rabin Polynomial hash function) calculated on the name of the class. The table can also have a prefix "T." For example, if the name of the class is Node and hash("Node")=xxx, the table name can be Txxx. The framework adds a column comprising columns for a class identifier and an instance identifier to the class table for an object identifier (operation 534), as described in conjunction with FIG. 4C.

The framework identifies an attribute of the identified class (operation 536). It should be noted that the relationships for which the class is a container class are can also be attributes, as described in conjunction with FIG. 4A. The framework then checks whether the attribute is a simple attribute (e.g., not a relationship) (operation 538). If the attribute is a simple attribute, the framework adds a column for the identified attribute to the class table (operation 540). If the attribute is not a simple attribute (e.g., an attribute representing a relationship), the framework checks whether the attribute corresponds to a one-to-one relationship (operation 544). If the attribute corresponds to a one-to-one relationship, the framework adds a column, which is for an object identifier, comprising columns for class identifier and instance identifier of the object identifier (operation 546), as described in conjunction with FIG. 4C.

The framework enforces consistency on the class identifier and the instance identifier based on the corresponding auxiliary tables of the related classes (operation 548), as described in conjunction with FIG. 4C. In some embodiments, the consistency is enforced based on a foreign key constraint. If the attribute does not correspond to a one-to-one relationship (i.e., corresponds to a one-to-many relationship), the framework generates an auxiliary table for the one-to-many relationship (operation 550) and enforce consistency on object identifiers in the auxiliary table for the one-to-many relationship (operation 552). Upon adding a column for the identified attribute (operation 540), enforcing consistency on the class identifier and the instance identifier (operation 548), or enforcing consistency on the object identifier (operation 552), the framework checks whether all attributes have been checked (operation 542). If not, the framework continues to identify an attribute of the identified class (operation 536).

Figure 5C:
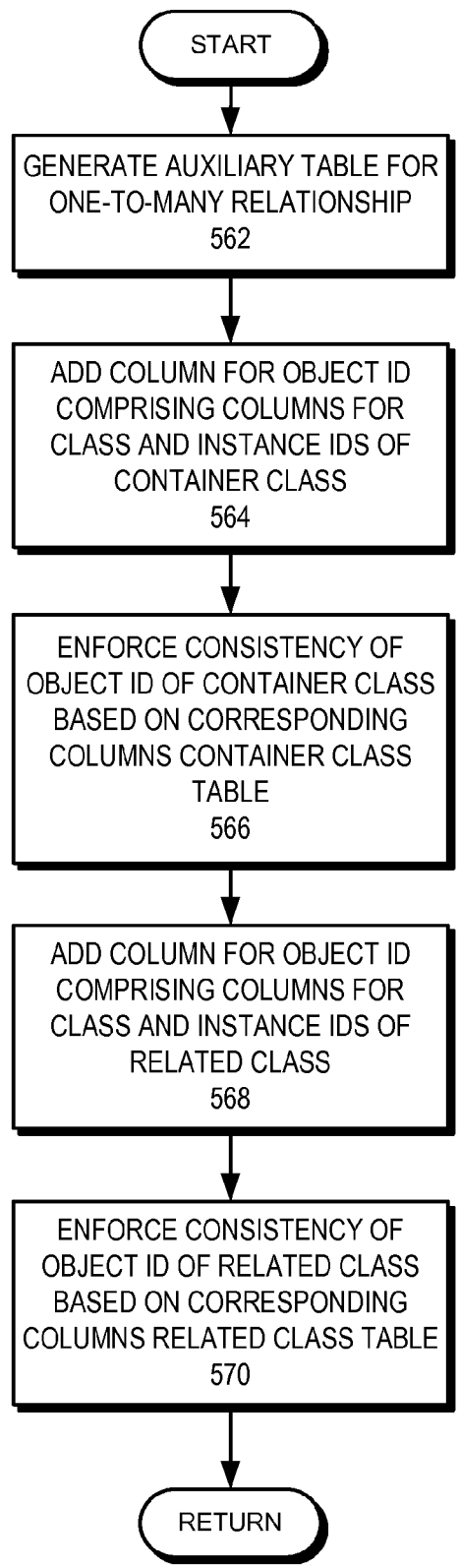
FIG. 5C presents a flowchart illustrating the process of a persistent storage framework of a switch generating an auxiliary table representing an one-to-many relationship in a persistent storage, in accordance with an embodiment of the present invention.

FIG. 5C presents a flowchart illustrating the process of a persistent storage framework of a switch generating an auxiliary table representing an one-to-many relationship in a structured persistent storage, in accordance with an embodiment of the present invention. Operations described in FIG. 5C elaborates operation 550 of FIG. 5B. During operation, the framework generates an auxiliary table for the one-to-many relationship (operation 562). In some embodiments, the name of the auxiliary table is based on the container table name, related table name, and the relationship name. For example, if the container table name is Txxx, related table name is Tyyy, and the relationship name is ABC, the name of the auxiliary table can be TxxxABCTyyy.

The framework adds a column for an object identifier comprising columns for class identifier and instance identifier of the container class (operation 564), as described in conjunction with FIG. 4D. The framework enforces consistency on the object identifier (i.e., both the class identifier and the instance identifier) of the container class based on the corresponding columns of the container class table (operation 566). Similarly, the framework adds a column for an object identifier comprising columns for class identifier and instance identifier of the related class (operation 568), as described in conjunction with FIG. 4D. The framework enforces consistency on the object identifier (i.e., both the class identifier and the instance identifier) of the related class based on the corresponding columns of the related class table (operation 570).

Figure 5D:
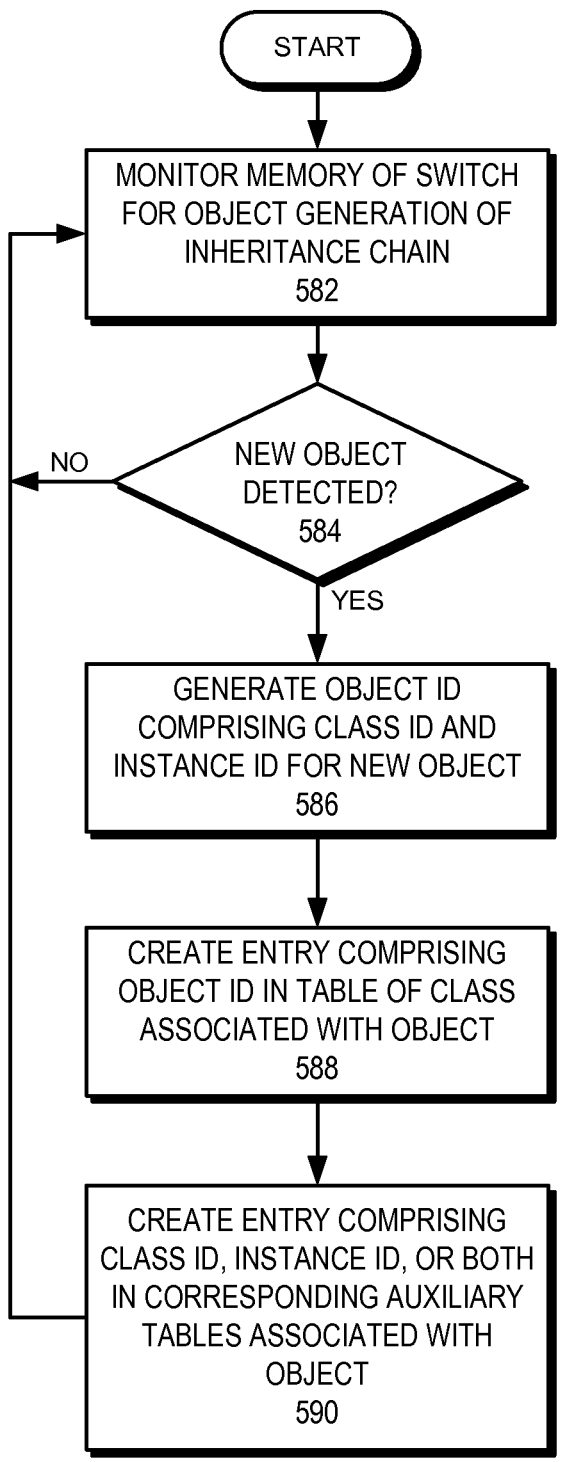
FIG. 5D presents a flowchart illustrating the process of a persistent storage framework of a switch updating tables in a persistent storage, in accordance with an embodiment of the present invention.

FIG. 5D presents a flowchart illustrating the process of a persistent storage framework of a switch updating tables in a persistent storage, in accordance with an embodiment of the present invention. During operation, the framework monitors the memory of the switch for object generation of the inheritance chain (operation 582) and checks whether a new object has been detected (operation 584). If a new object has not been detected, the framework continues to monitor the memory of the switch (operation 582). If a new object has been detected, the framework generates an object identifier comprising a class identifier and an instance identifier for the new object (operation 516). The frame creates an entry comprising the object identifier in the table of a class associated with the object (i.e., the class from which the object has been instantiated) (operation 588). The framework creates an entry comprising the class identifier, instance identifier, or both in corresponding auxiliary tables associated with the object (operation 590) and continues to monitor the memory of the switch (operation 582).

Distributed Configuration Management

In the example in FIG. 1A, network 100 can be a switch group (e.g., an Ethernet fabric switch). Under such a scenario, network 100 can also be referred to as switch group 100. In some embodiments, a switch group is a fabric switch. FIG. 6A illustrates an exemplary network with persistent storage framework and distributed configuration management support, in accordance with an embodiment of the present invention. In this example, switch 102, which is in switch group 100, can be configured by logging in to switch 102 using a management IP address (MIPA) 632 via a management port 602. Management port 602 can be an edge port, which is used for communicating configuration and control traffic. Switch 102 may not use management port 602 for data traffic. A user (e.g., an administrator) can use an end device 612 to log in to switch 102 based on management IP address 632 (e.g., using telnet via network 620). Switch 102 can also be configured via a console port (e.g., an RS-232 port) 604, which couples an end device 614 (e.g., a workstation). The user can access an input interface (e.g., a textual or graphical interface) of switch 102 from end device 612 or 614.

With existing technologies, a respective switch in switch group 100 is configured individually and the configuration process is repeated for a respective switch in switch group 100. Such configuration can be related to network virtualizations, partitions, and switch groups, and a plurality of network protocols of different network layers. The attribute values (e.g., parameters) of the configuration are applied to a respective switch, such as switch 102 (e.g., loaded to the switch modules, such as the processing hardware of switch 102). This process is repeated for switches 101, 103, 104, and 105. This process can be repetitive, tedious, and error-prone (e.g., human errors, such spelling mistake).

Furthermore, some of the configuration information is applicable for entire switch group 100 (e.g., a VLAN for switch group 100). Such configuration can be referred to as global configuration. This global configuration is repeated for a respective switch in switch group 100. This can lead to inconsistency among the global configuration in different switches in switch group 100. For example, the user repeats global configuration for switch 101, 102, 103, 104, and 105 in switch group 100. The user may, mistakenly, configure VLAN 110 in switch 102 and VLAN 111 in switch 101. As a result, traffic belonging to VLAN 110 may be erroneously dropped at switch 101.

To solve this problem, one of the switches in switch group 100 is elected as a principal switch, which manages and distributes configuration information in switch group 100. Suppose that switch 102 is elected as the principal switch. In some embodiments, a respective switch in switch group 100 broadcasts its information in switch group 100, and the switch with the lowest (or highest) identifier value is elected as the principal switch. Other switches of switch group 100, such as switches 101, 103, 104, and 105, can be referred to as managed switches. When the user accesses switch 102 (e.g., via end device 112 or 114), switch 102 allows the user to configure the global configuration of switch group 100. Switch 102, in turn, provides that global configuration to switches 101, 103, 104, and 105. Furthermore, switch 102 also allows the user to configure switches 101, 103, 104, and 105 in the switch group. Switch 102, in turn, provides the corresponding local configuration information to switches 101, 103, 104, and 105, respectively.

In some embodiments, a respective switch of switch group 100 is equipped with a persistent storage framework, as described in conjunction with FIG. 1B. The framework stores the configuration information, comprising both local and global configuration information, in a local persistent storage, which can be an object relational database. For example, in switch 102, framework 120 stores the configuration information in object relational database 150. The configuration information is loaded from database 150 to the switch modules (e.g., the ASIC chips of switch 102). Framework 120 maintains the global configuration of switch group 100 in database 150. Framework 120 also maintains respective local configuration of a respective switch, including switch 102, of switch group 100 in database 150. Switch 102 then provides a copy of database 150 to switches 101, 103, 104, and 105, each of which in turn, stores that copy in its object relational database. In this way, a respective switch in switch group 100 has the same local and global configuration. This allows a user to access the configuration of switch group 100 from any member switch.

Since switch 102 can also be accessed via console port 604 via end device 614, the user can configure switches of switch group 100 without the presence of a management network. It should be noted that, even though a user can configure the switches of switch group 100 from principal switch 102, the user can obtain the local configuration information of a respective switch of switch group 100 via any of the member switches of the switch group. For example, switch 101 can be accessed by logging in to switch 101 using a management IP address 631 via a management port 606. The user can use an end device 616 to log in to switch 101 based on management IP address 631. Since switch 101 includes the configuration information in object relational database 640 of switch 101, the user can obtain the global configuration information as well the local configuration information of a respective switch of switch group 100 from switch 101.

In some embodiments, switch group 100 is associated with a virtual IP address 610. During operation, virtual IP address 610 is associated with the principal switch of switch group 100. As a result, the user can access principal switch of group 100 via virtual IP address 610 without knowing the management IP address 632. Furthermore, if switch 102 becomes unavailable (e.g., due to a failure), another switch in switch group 100, such as switch 101, is elected as the principal switch and virtual IP address 610 becomes associated with switch 101. Since switch 101 has the configuration information in database 640 is the same as the configuration information in database 150, switch 101 can continue to facilitate distributed configuration for the switches of switch group 100. As a result, the user can continue to access the principal switch of switch group 100, which is switch 101, via virtual IP address 610 and configure the switches of switch group 100.

In some embodiments, a respective switch in switch group 100 is associated with an internal control IP address (ICIPA), which is used for communication among member switches of switch group 100. For example, an internal control IP address can be used for communication via an inter-switch port. When the principal switch of a switch group provides the configuration information to a managed switch, the principal switch communicates with that managed switch based on respective internal control IP addresses. Suppose that internal control IP addresses 621 and 622 are associated with switches 101 and 102, respectively. When switch 102 provides the configuration information to switch 101, switch 102 uses IP addresses 621 and 622 as the destination and source addresses for the packets comprising the configuration information.

In some embodiments, a respective switch in a switch group can receive configuration information from a user. FIG. 6B illustrates an exemplary switch group with multi-input and multi-principal switch support, in accordance with an embodiment of the present invention. In this example, switches 101, 102, 103, 104, and 105 are associated with management IP addresses 631, 632, 633, 634, and 635, respectively. A user can provide configuration information to a respective switch (e.g., via a console of the switch) in switch group 100 by logging in to that switch using the corresponding management IP address via a management port. For example, a user can log in to switch 103 using management IP address 633 and provides configuration information 664. Configuration information 664 can be global configuration information associated with switch group 100 or local configuration information associated with any of the member switches. Similarly, the user can log in to switch 101 using management IP address 633 and provides configuration information 662.

Suppose that configuration information 662 and 664 can cause a conflict in the switch. For example, configuration information 662 and 664 can be associated with conflicting quality of service settings for switch 105. If both switches 101 and 103 are allowed to operate as a principal switch, switches 101 and 103 can individually apply these conflicting configurations to switch 105. This can lead to race condition in switch group 100. To solve this problem, a switch group internally has one principal switch, and other switches forward their received configuration information to that principal switch. That principal switch receives the configuration information, serializes them, resolves any conflict, and applies them based on distributed commit. In this way, it would appear to the user that the switch group is being configured from any of the member switches, though internally, the switch group is configured from the principal switch.

For example, switches 101 and 103 forward configuration information 662 and 664, respectively, to principal switch 102 of switch group 100. Switch 102 receives configuration information 662 and 664, and serializes them (e.g., based on the order of arrival or an associated priority). In some embodiments, if switch 102 detects any conflict, switch 102 resolves the conflict based on its serialization. For example, configuration information 664 is serialized before configuration information 662, switch 102 resolves the conflict by applying the configuration of configuration information 664 to switch 105 based on distributed commit, and discarding configuration information 662. In this way, it would appear to the user that switch 105 is being configured switches 101 and/or 103, though internally, switch 102 configures switch 105.

In some embodiments, in switch group 100, different member switch can be the principal switch for different services. A service can be a modular component which manages a related set of configuration. In the example in FIG. 1B, a plug-in can correspond to a service. A principal switch manages all global and local configuration information of the service the switch is associated with. Suppose that switches 101 and 102 are principal switches for port management and network virtualization, respectively. As a result, in switch group 100, switch 101 processes all global and local configuration information associated with port management, and switch 102 processes all global and local configuration information associated with network virtualizations. In some embodiments, switches in switch group 100 elect a principal switch for a respective service. The election process can be based on load balancing such that different services are associated with different principal switches.

During operation, a user logs in to switch 102 using management IP address 632 and provides configuration information 666, which is associated with port management (e.g., creating a port channel). Even though switch 102 is a principal switch, switch 102 forwards configuration information 666 to switch 101 since switch 101 is the principal switch for port management. On the other hand, suppose that configuration information 662 is associated with network virtualization (e.g., creating a new VLAN). Even though switch 101 is a principal switch, switch 101 forwards configuration information 662 to switch 102 since switch 102 is the principal switch for network virtualization.

Online Restoration of Switch Snapshots

Figure 7:
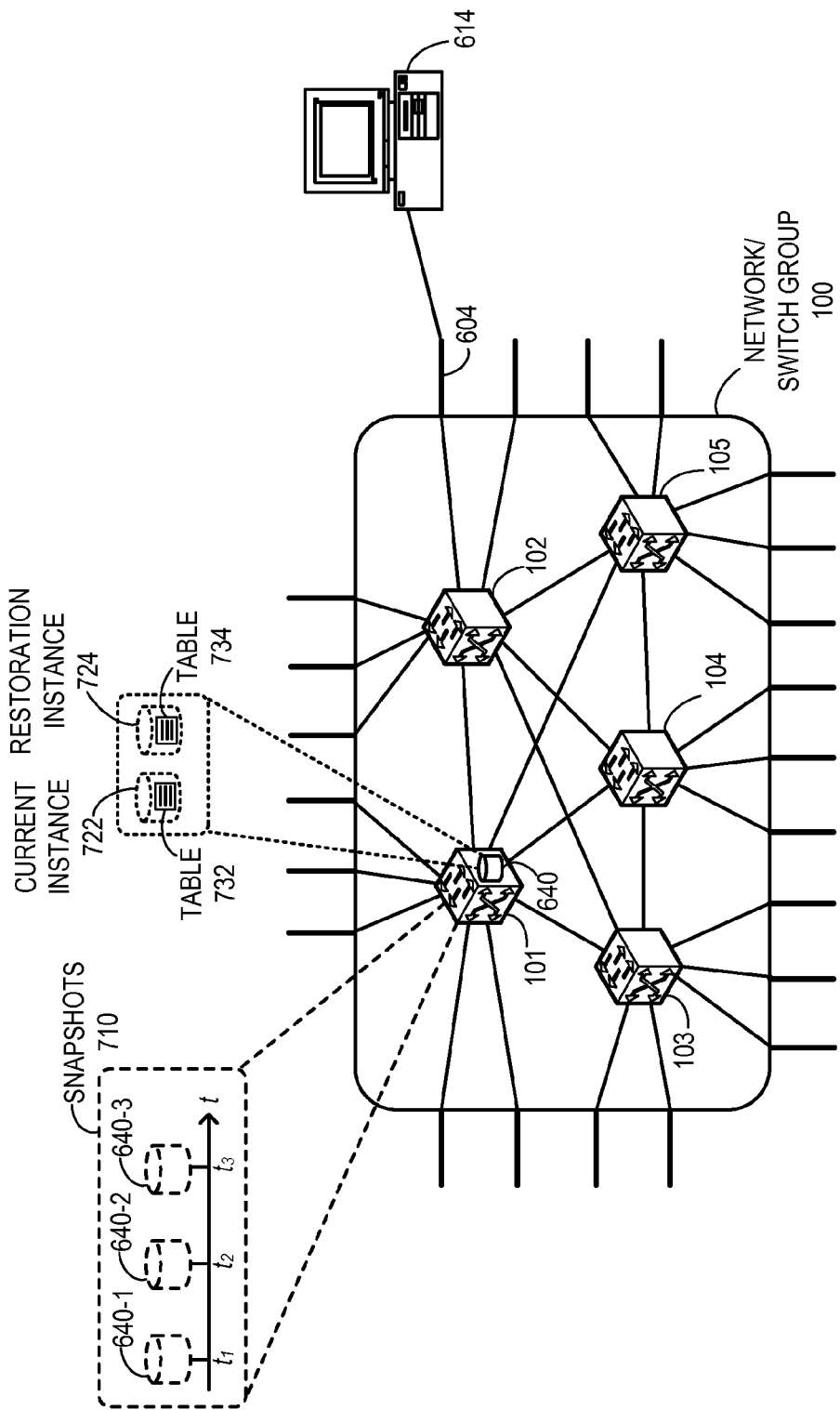
FIG. 7 illustrates an exemplary switch group with persistent storage framework and support for online restoration of switch snapshots, in accordance with an embodiment of the present invention.

FIG. 7 illustrates an exemplary switch group with persistent storage framework and support for online restoration of switch snapshots, in accordance with an embodiment of the present invention. In this example, switch 101 stores its configuration information in database 640. This configuration information of switch 101 can continue to change due to different circumstances. For example, a user can create a new VLAN for switch 101 and switch group 100. As a result, both local and global configuration information in database 640 can change. If the user identifies configuration information for which switch 101 is operating in a desirable way, the user can take a snapshot of the files to run the switch. This snapshot can be referred to a switch snapshot.

The switch snapshot describes the state of switch 101 at a particular moment in time. Typically, the snapshot includes images of the files needed to run switch 101. During operation, user takes a respective switch snapshot of switch 101 at time $t_1$, $t_2$, and $t_3$. With existing technologies, to take a switch snapshot, the user retrieves the current configuration (e.g., executes a "show running-config" command) of switch 101 and stores that configuration information in a file (e.g., a text file). This requires manual and tedious intervention of the user. Furthermore, if needed, the user can restore switch 101 to one of the saved switch snapshots in switch 101.

To solve this problem, switch 101 uses its database 640 to store configuration information of switch 101. Switch 101 has a current database instance 722 comprising the current configuration information based on which the switch is currently running. The current operations and updates of switch 101 are applied to current database instance 722. Furthermore, configuration information of switch 101 is loaded to its switch modules from current database instance 722. When switch snapshots 710 are taken for switch 101 at time $t_1$, $t_2$, and $t_3$, database images 640-1, 640-2, and 640-3, respectively, are created (denoted with dashed lines). The database images include the configuration information in database 640 at a corresponding time.

For example, at time $t_1$, switch 101 receives an instruction to create a switch snapshot from a user and creates database images 640-1. Switch 101 creates database image 640-1, associates a filename and a timestamp with database image 640-1, and stores database image 640-1 in an internal and/or hidden folder in the internal file structure of switch 101. Switch 101 can also obtain a file path in the file structure of switch 101 from the user and store database image 640-1 at that file path. Switch 101 allows the user to export database image 640-1 to an external repository (e.g., end device 614). During restoration, switch 101 then obtains a link to database image 640-1 and retrieves database image 640-1 from the external respiratory. In some embodiments, instead of creating a database image, switch 101 utilizes the checkpoint feature of database 640. Upon receiving the instruction from the user, switch 101 creates a checkpoint in database 640 for time $t_1$. Database 640 then saves a reverse operation for all subsequent changes to database 640 from time $t_1$. During restoration, database 640 executes all the reverse operations and creates a database instance corresponding database image 640-1.

Suppose that, at some point, switch 101 receives an instruction to restore switch 101 with switch snapshot 640-1 of time $t_1$. In some embodiments, for restoration, switch 101 can reboot with database image 640-1, which then becomes the current database instance of database 640. Upon reboot, switch 101 applies the configuration information of database image 640-1 to the switch modules and start operating with that configuration information. However, during the restoration operation, switch 101 becomes offline and unavailable. The service of switch 101 remains unavailable during the restoration process to switch group 100. Moreover, after restoration, switch group 100 may require re-convergence.

To solve this problem, switch 101 uses its database 640 for online restoration of database image 640-1. Upon receiving the instruction to restore switch 101 with switch snapshot 640-1, switch 101 retrieves database image 640-1 of time $t_1$ and instantiate database image 640-1 in database 640 as a restoration database instance 724 comprising configuration information of database image 640-1. At this point, database 640 includes two database instances—current database instance 722 and a restoration database instance 724 (denoted with dotted lines). In some embodiments, switch 101 uses a presentation layer (e.g., a YANG model) for representing the configuration information of switch 101. The presentation layer provides data modeling for switch 101 and its interaction with other switches. Switch 101 retrieves different elements of the configuration information (e.g., VLAN configuration, interface configuration, etc) and their corresponding interdependencies from the presentation layer.

In some embodiments, an element of the configuration information (e.g., VLAN configuration) is associated with a class definition of an underlying UML layer (e.g., a VLAN class definition in a UML model). An example of such a UML model is described in conjunction with FIG. 4A. Switch 101 obtains a respective element of the configuration information from the presentation layer and identifies the corresponding class definition from the UML layer. Switch 101 then identifies in current database instance 722 and restoration database instance 724 the tables associated with the identified class definitions. Suppose that database instances 722 and 724 include tables 732 and 734, respectively, corresponding the VLAN class in the UML model. Here, table 732 includes the current VLAN configuration of switch 101 (and/or switch group 100) and table 734 includes the VLAN configuration of switch 101 (and/or switch group 100) at time $t_1$. In another example, in FIGS. 4A and 4C, database table 420 is associated with class 404 in the UML model.

Switch 101 then retrieves the attribute values stored in tables 732 and 734, and identifies the differences between the attribute values. For example, the differences can be the current VLANs configured for switch 101 and the VLANs configured for switch 101 at time $t_1$. Based on the differences, switch 101 determines the configuration information (e.g., VLANs) that should be added to and removed from the switch modules of switch 101 (e.g., VLAN configurations, such as VLAN tags, that should be added to and removed from the switch modules). In some embodiments, switch 101 obtains the interdependencies of the attribute values of the configuration information that should be added to or removed from the switch modules from the presentation layer. The interdependencies indicate which information to be removed before removing other information, or to be added before adding other information. Switch 101 can consider interdependencies among the removes and the adds separately.

In some embodiments, switch 101 first removes and then adds configuration information. Based on the interdependencies among the attribute values of the configuration information that should be removed, switch 101 removes the corresponding attribute values from the switch modules (e.g., ASIC chips of switch 101). Similarly, based on the interdependencies among the attribute values of the configuration information that should be added, switch 101 adds the corresponding attribute values to be added to the switch modules. Switch 101 also starts operating restoration database instance 724 as the current database instance from then onwards. In other words, the configuration information of restoration database instance 724 becomes the current configuration information of switch 101. In this way, switch 101 facilitates online switch snapshot restoration, thereby retaining the service of the switch during the restoration process (e.g., without a reboot).

In some embodiments, switch group 100 considers switch 101 to be a switch rejoining switch group (i.e., rejoining switch group 100 after it has converged). If the global configuration information of switch 101 has changed for the restoration, depending on the policy, switch 102 may or may not allow switch 101 to rejoin. In some embodiments, switch 102 sends the global configuration information from its database 150 to switch 101, which in turn, updates the global configuration information in its current database instance (i.e., database instance 724 after the restoration) and applies to its switch modules. On the other hand, if the local configuration information of switch 101 has changed, switch 102 receives the changed local configuration information from switch 101 and performs a distributed commit on the changed local configuration information. In this way, the local configuration information of switch 101 is updated in the persistent storage of a respective member switch, including databases 150 and 640.

Retrieval Model for Restoration

As described in conjunction with FIG. 7, switch 101 includes a presentation layer, a UML layer, and a database. During the online restoration process, switch 101 uses them for retrieval of attribute values. Switch 101 obtains different elements of configuration information from the presentation layer and obtains a respective class associated with a respective element. Switch 101 retrieves the attribute values from a respective table associated with a respective class definition from a current and a restoration database instance. Switch 101 then calculates the differences needed from the obtained attribute values, applies the differences to the switch modules, and starts operating the restoration database instance as the current database instance. In this way, switch 101 uses this retrieval model of attribute values to facilitate an online switch snapshot restoration. In some embodiments, the persistent storage framework of switch 101 performs the retrieval operations.

Figure 8A:
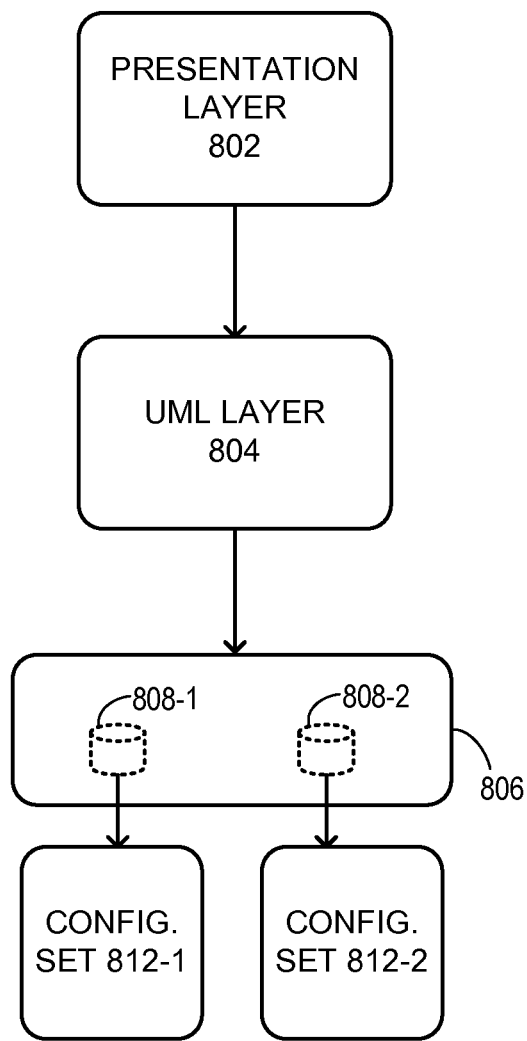
FIG. 8A illustrates an exemplary retrieval model of attribute values for online restoration of switch snapshots, in accordance with an embodiment of the present invention.

FIG. 8A illustrates an exemplary retrieval model of attribute values for online restoration of switch snapshots, in accordance with an embodiment of the present invention. A switch can have a presentation layer 802, a UML layer 804, and a database 806. Presentation layer 802 facilitates data modeling, which provides descriptions of the switch and its interaction with other network devices. In some embodiments, presentation layer 802 is represented by a YANG model. Presentation layer 802 defines one or more hierarchies of configuration information elements associated with switch states, Remote Procedure Calls (RPCs), and notifications. Information represented in presentation layer 802 can be human-readable (e.g., can be easily represented). Since it provides hierarchical configuration information elements, presentation layer 802 can provide interdependencies among the elements.

Presentation layer 802 can use reusable representation and grouping structures, and is extensible via augmentations. In some embodiments, presentation layer 802 enforces formal constraints for validation of configuration information. This can be used to ensure proper restoration of a switch snapshot. Furthermore, presentation layer 802 provides data modularity for different elements of the configuration information. Presentation layer 802 can also provide versioning rules, which allows the switch to manage different versions. Presentation layer 802 facilitates a user view of the elements of the configuration information as well as its dependencies for the switch.

In a switch, UML layer 804 is associated with presentation layer 802. For example, a respective configuration element represented in presentation layer 802 is associated with a class in a UML model. In some embodiments, the switch maintains a mapping between a configuration element represented in presentation layer 802 and a corresponding class in the UML model. As a result, when switch retrieves an element of the configuration information of the switch from presentation layer 802, the switch can readily identify the classes that represent and support that element in the switch. Hence, UML layer 804 facilitates identification of the managed object(s) that are associated with an element of the configuration information.

A respective class is associated with a table in a database 806 in the switch. Database 806 includes a current database instance 808-2, which stores attribute values of the current configuration information of the switch in its tables. When a user instructs the switch to restore a switch snapshot, the switch obtains the corresponding database image and instantiate that database image in database 806, and thus, creates restoration database instance 808-1. The switch identifies a respective table associated with a respective identified class of UML layer 804 in instances 808-1 and 808-2. The switch then retrieves the attribute values from the identified table and determines the difference in attribute values between the instances. This difference includes the attribute values that should be deleted from and added to the switch modules of the switch. This difference corresponds to the attribute values that should be deleted from and added to current database instance 808-2 to revert back to restoration database instance 808-1. In some embodiments, the retrieval operations are performed by the persistent storage framework of the switch.

It should be noted that the determined attribute values may not be applied to current database instance 808-2 to revert back to restoration database instance 808-1 since restoration database instance 808-1 is already instantiated in database 806. As a result, the switch simply starts using instance 808-1 as the current database instance. However, the switch modules are still loaded with the attribute values of current database instance 808-2. Hence, the switch applies the difference in attribute values to the switch modules online (e.g., without rebooting the switch). Then the switch modules become loaded with the attribute values of restoration database instance 808-1. In this way, the retrieval model enables the switch to perform online restoration of a switch snapshot.

Figure 8B:
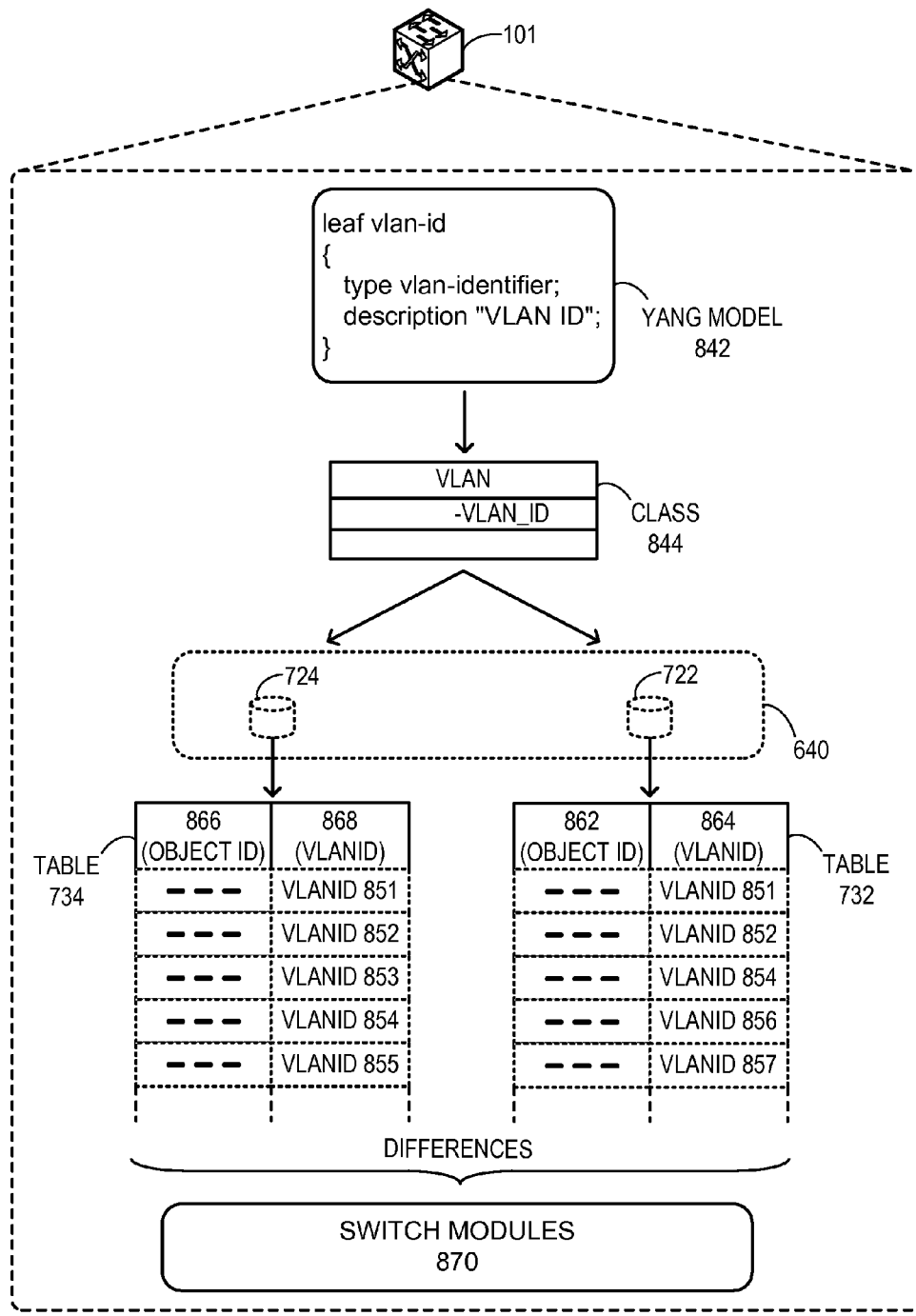
FIG. 8B illustrates an exemplary application of the retrieval model of attribute values for online restoration of switch snapshots, in accordance with an embodiment of the present invention.

FIG. 8B illustrates an exemplary application of the retrieval model of attribute values for online restoration of switch snapshots, in accordance with an embodiment of the present invention. In this example, switch 101 has YANG model 842 as a presentation layer representation of VLAN identifiers, which is an element of the configuration information of switch 101. YANG model 842 specifies that a VLAN has a VLAN identifier (described as a "VLAN ID"). Since YANG model 842 presents a VLAN identifier, it is associated with a corresponding class 844, denoted as the VLAN class, for VLANs in its UML layer. The VLAN class includes an attribute VLAN_ID, which represents the VLAN identifier.

In some embodiments, switch 101 maintains a mapping between YANG model 842, which represents a configuration element, and a corresponding class 844. As a result, when the persistent storage framework of switch 101 retrieves from YANG model 482 that VLAN identifiers represent a configuration element, the framework can identify the corresponding VLAN class, which defines the VLAN identifies. As described in conjunction with FIGS. 4A-4D, from the VLAN class, the framework identifies a corresponding VLAN table in database 640. When switch 101 receives an instruction to restore database image 640-1, switch 101 creates a restoration database instance 724 in database 640. At that point, database 640 includes current database instance 722, which includes VLAN table 732, and restoration database instance 724, which includes VLAN table 734, as described in conjunction with FIG. 7.

Table 732 includes a column 862 for an object identifier associated with the VLAN class. Table 732 also includes a column for a respective attribute of the VLAN class. For example, table 732 includes a column 864 for a VLANID (a VLAN identifier) of the VLAN class. Since table 734 is also for the VLAN class, table 734 includes a column 866 for an object identifier associated with the VLAN class. Table 734 also includes a column 868 for a VLANID (a VLAN identifier) of the VLAN class. It should be noted that, even though not shown in FIG. 8B, each of columns 862 and 866 includes two columns for class identifier and instance identifier, respectively, of the object identifier associated with the VLAN class.

The framework then retrieves the attribute values from tables 732 and 734. The framework retrieves VLANIDs 851, 852, 854, 856, and 857 of the VLANs currently configured for switch 101 from column 864, and VLANIDs 851, 852, 853, 854, and 855 of the VLANs configured for switch 101 at time $t_1$ from column 868. The framework then determines the difference in attribute values between instances 722 and 724 (e.g., between tables 732 and 734). This difference includes the attribute values that should be deleted from and added to switch modules 870 of switch 101. This attribute values correspond to the values that should be deleted from and added to current database instance 722 to revert back to restoration database instance 724. For example, the framework determines that entries with VLANIDs 856 and 857 to be removed from and entries with VLANIDs 853 and 855 to be added to table 732 of instance 722 to revert back to table 734 of instance 724.

It should be noted that entries with VLANIDs 856 and 857 may not be removed from and entries with VLANIDs 853 and 855 may not be added to table 732 since restoration database instance 724 is already instantiated in database 640. As a result, the framework simply starts operating instance 724 as the current database instance. However, switch modules 870 of switch 101 are still configured with VLANs with VLANIDs 856 and 857. Hence, switch 101 removes configuration for VLANs with VLANIDs 856 and 857 from switch modules 870. Similarly, switch modules 870 are not yet configured with VLANs with VLANIDs 853 and 855. Hence, switch 101 configures VLANs with VLANIDs 853 and 855 in switch modules 870. In this way, the retrieval model enables switch 101 to perform online restoration of a switch snapshot corresponding to database image 640-1, thereby allowing switch 101 to revert back to the configuration of time $t_1$.

Operations

Figure 9A:
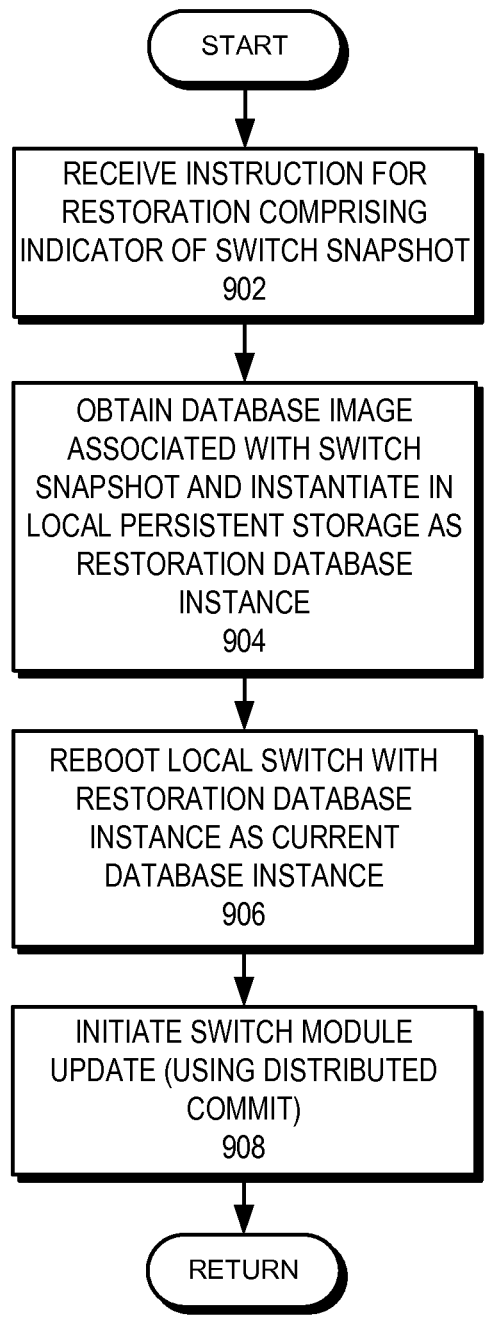
FIG. 9A presents a flowchart illustrating the offline switch snapshot restoration process of a switch with persistent storage framework, in accordance with an embodiment of the present invention.

FIG. 9A presents a flowchart illustrating the offline switch snapshot restoration process of a switch with persistent storage framework, in accordance with an embodiment of the present invention. During operation, the switch receives an instruction for a restoration (operation 902). The switch can receive this configuration information from a user command. A user can issue the command locally (e.g., via a command line interface command) or remotely (e.g., via telnet, or NETCONF), as described in conjunction with FIG. 6B. The instruction includes an indicator of the switch snapshot to be restored. Examples of the indicator include, but are not limited to, a filename, a file path (i.e., location of a file in a local or remote directory), a network address (e.g., a MAC address and/or an IP address) of a remote respiratory, a checkpoint of a database, and a combination thereof.

Based on the indicator, the switch obtains a database image associated the switch snapshot and instantiates the image in the local persistent storage as the restoration database instance (operation 904). The switch then reboots the local switch with the restoration database instance as the current database instance (operation 906). The switch then initiates a switch module update (operation 908). If the switch is a standalone switch, the switch applies the configuration information of the current database instance to the local switch modules. On the other hand, if the switch is a member switch of a switch group, the switch rejoins the switch group with the reboot. The principal switch updates the switch group accordingly using a distributed commit, as described in conjunction with FIGS. 10A-10B.

Figure 9B:
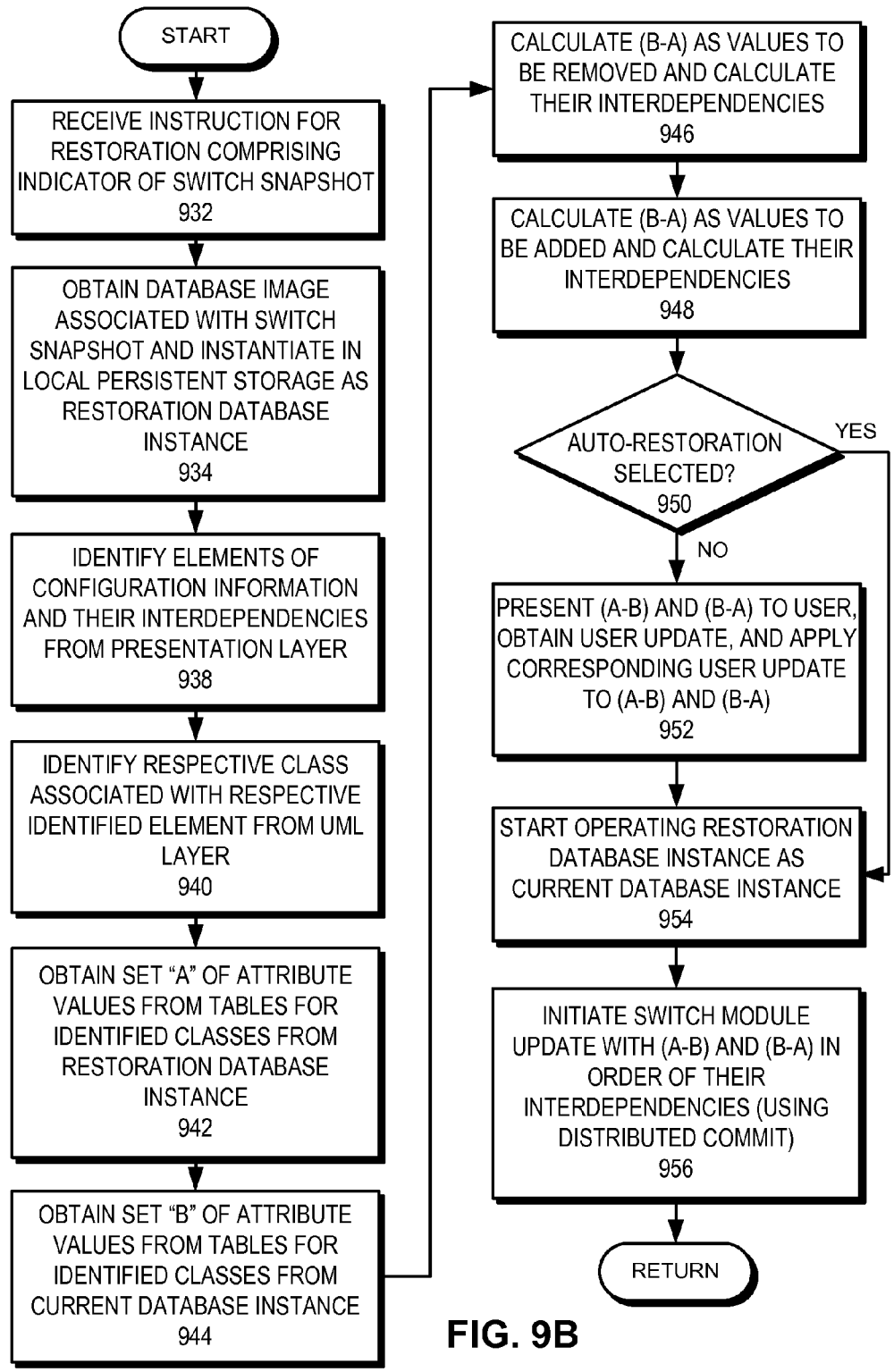
FIG. 9B presents a flowchart illustrating the online switch snapshot restoration process of a switch with persistent storage framework, in accordance with an embodiment of the present invention.

FIG. 9B presents a flowchart illustrating the online switch snapshot restoration process of a switch with persistent storage framework, in accordance with an embodiment of the present invention. During operation, the switch receives an instruction for a restoration comprising an indicator of the switch snapshot to be restored (operation 932). Based on the indicator, the switch obtains a database image associated the switch snapshot and instantiates the image in the local persistent storage as the restoration database instance (operation 934). The switch identifies the elements of the configuration information and their respective interdependencies from a presentation layer (operation 938), as described in conjunction with FIG. 8A. The switch then identifies respective class associated with a respective identified element from a UML layer (operation 940).

The switch obtains a set "A" of attribute values from tables for the identified classes from the restoration database instance (operation 942) and a set "B" of attribute values from tables for the identified classes from the current database instance (operation 944). The switch then calculates (B-A) as values to be removed and calculates their interdependencies (operation 946). The switch also calculates (A-B) as values to be added and calculate their interdependencies (operation 948). Here, (A-B) and (B-A) can be set differences. The switch checks whether the user has selected an auto-restoration option (operation 950). If an auto-restoration option is not selected, the switch presents (A-B) and (B-A) to the user (e.g., either locally via a management port or remotely via a management IP address), obtains corresponding user update, and applies the corresponding user update to (A-B) and (B-A) (operation 952). This allows a user to adjust the changes to the attribute values during the restoration process.

If an auto-restoration option is selected, the user allows the switch to restore the switch snapshot without user intervention. Under such circumstances, the switch may not present (A-B) and (B-A) to the user. If an auto-restoration option is selected (operation 950) or the user has updated (A-B) and (B-A) (operation 952), the switch starts operating the restoring database instance as the current database instance (operation 954), as described in conjunction with FIG. 8B. The switch then initiates a switch module update with (A-B) and (B-A) in the order of their interdependencies (operation 956). If the switch is a standalone switch, the switch applies (A-B) and (B-A) to the local switch modules. On the other hand, if the switch is a member switch of a switch group, the switch provides (A-B) and (B-A) to the principal switch, which in turn, updates the switch group accordingly using a distributed commit, as described in conjunction with FIGS. 10A-10B.

Distributed Commit

Figure 10A:
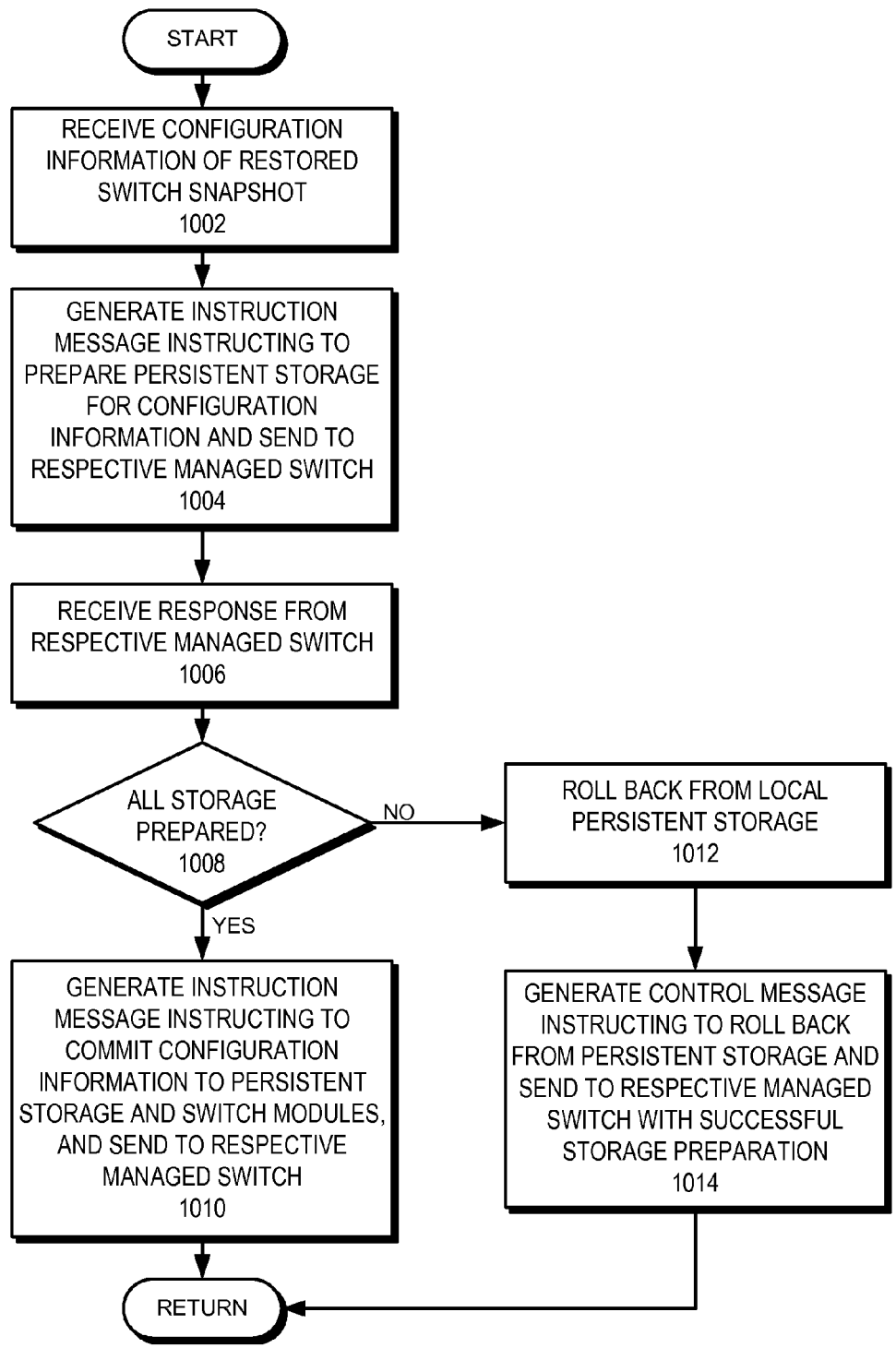
FIG. 10A presents a flowchart illustrating the distributed commit process of a principal switch applying configuration information of a restored switch snapshot in a switch group, in accordance with an embodiment of the present invention.

FIG. 10A presents a flowchart illustrating the distributed commit process of a principal switch applying configuration information of a restored switch snapshot in a switch group, in accordance with an embodiment of the present invention. During operation, the switch receives configuration information of a restored switch snapshot (operation 1002). In some embodiments, this configuration information includes the differences between the attribute values of the restoration database instance and the current database instance in the persistent storage of a restored switch. The switch then generates and sends an instruction message to a respective managed switch instructing to prepare their local persistent storage for the configuration information (operation 1004). The switch receives a response from a respective managed switch (operation 1006) and checks whether all persistent storages have been prepared (operation 1008). If all persistent storages have not been prepared, the switch rolls back the configuration information from the local persistent storage (operation 1012).

The switch also generates a control message instructing to roll back the configuration information from the persistent storage and sends the message to a respective managed switch with successful storage preparation (operation 1014) (e.g., the switch may not send the control message to the managed switches which have not succeeded in preparing their corresponding local persistent storage). If all persistent storages have been prepared, the switch generates a control message instructing to commit the configuration information to the persistent storage and the switch modules, and sends the message to a respective switch (operation 1010). In this way, the distributed commit allows a principal switch to load the configuration information of a restored switch to the switch modules of a specific switch, and store the local configuration information in the persistent storage of a respective switch in the switch group.

Figure 10B:
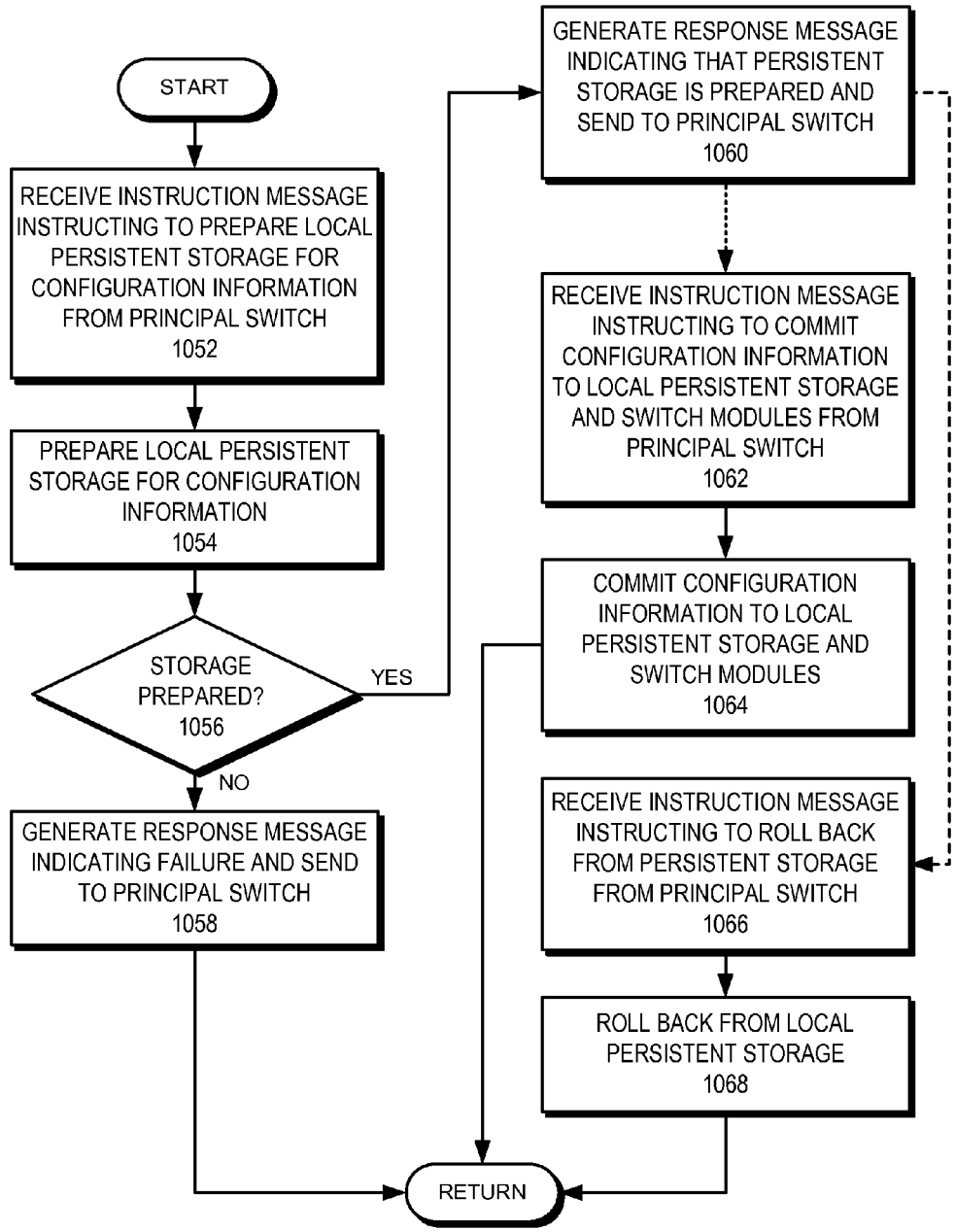
FIG. 10B presents a flowchart illustrating the distributed commit process of a managed switch applying configuration information of a restored switch snapshot received from a principal switch, in accordance with an embodiment of the present invention.

FIG. 10B presents a flowchart illustrating the distributed commit process of a managed switch applying configuration information of a restored switch snapshot received from a principal switch, in accordance with an embodiment of the present invention. During operation, the switch receives an instruction message from the principal switch instructing to prepare the local persistent storage for the configuration information (operation 1052) and prepares the local persistent storage for the configuration information (operation 1054). This configuration information can be the differences between the attribute values of the restoration database instance and the current database instance in a persistent storage of a restored switch. The switch then checks whether the local persistent storage has been prepared (operation 1056). If prepared, the switch generates a response message indicating that the local persistent storage has been prepared for the configuration information and sends the message to the principal switch (operation 1060).

Depending on whether other managed switches have succeeded or not, the switch may or may not commit the configuration information. If all other managed switches have succeeded (denoted with a dotted arrow), the switch receives an instruction message from the principal switch instructing to commit the configuration information to the local persistent storage and the switch modules (operation 1062) and commits the configuration information to the local persistent storage and the switch modules (operation 1064). If at least one other managed switch has not succeeded (denoted with a dashed arrow), the switch receives an instruction message from the principal switch instructing to roll back the configuration information from the local persistent storage (operation 1066) and rolls back the configuration information from the local persistent storage (operation 1068). If the local persistent storage has not been prepared, the switch generates a response message indicating a failure and sends the message to the principal switch (operation 1058).

Exemplary Switch

Figure 11:
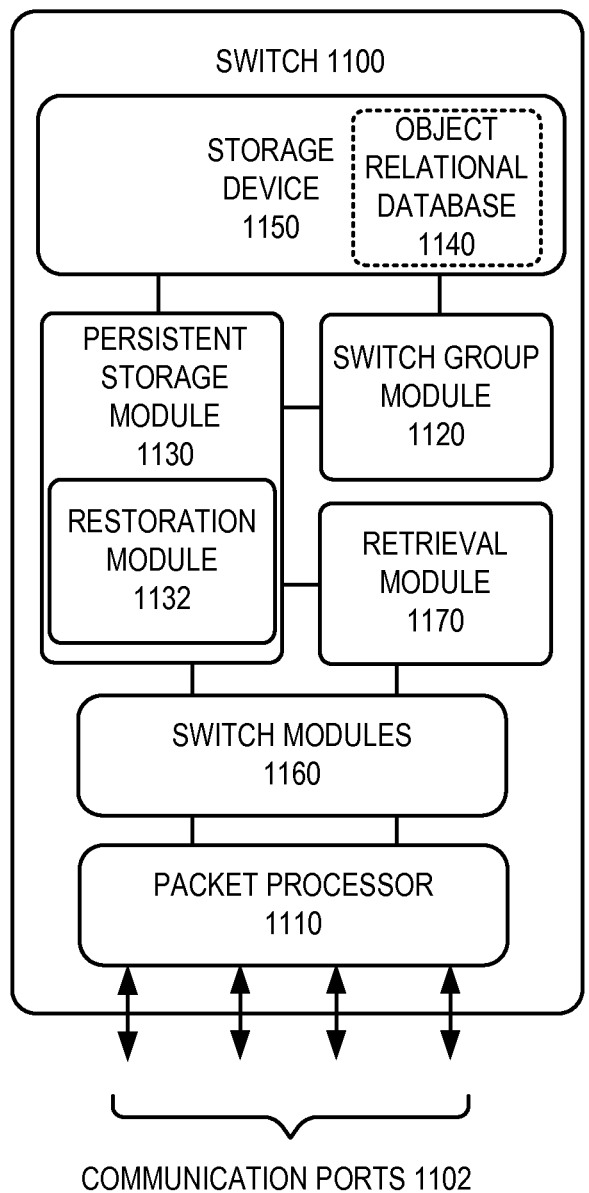
FIG. 11 illustrates an exemplary switch with a persistent storage framework and support for online restoration of a switch snapshot, in accordance with an embodiment of the present invention.

FIG. 11 illustrates an exemplary switch with a persistent storage framework and support for online restoration of a switch snapshot, in accordance with an embodiment of the present invention. In this example, a switch 1100 includes a number of communication ports 1102, a packet processor 1110, a persistent storage module 1130, a restoration module 1132, a retrieval module 1170, and a storage device 1150. Switch 1100 can also include switch modules 1160 (e.g., processing hardware of switch 1100, such as its ASIC chips), which includes information based on which switch 1100 processes packets (e.g., determines output ports for packets). Packet processor 1110 extracts and processes header information from the received frames. Packet processor 1110 can identify a switch identifier associated with the switch in header of a packet.

In some embodiments, switch 1100 maintains a membership in a switch group, as described in conjunction with FIG. 1, wherein switch 1100 also includes a switch group module 1120. Switch group module 1120 maintains a configuration database in storage device 1150 that maintains the configuration state of every switch within the fabric switch. Switch group module 1120 maintains the state of the fabric switch, which is used to join other switches. In some embodiments, switch 1100 can be configured to operate in conjunction with a remote switch as an Ethernet switch.

Communication ports 1102 can include inter-switch communication channels for communication within the fabric switch. This inter-switch communication channel can be implemented via a regular communication port and based on any open or proprietary format. Communication ports 1102 can also include one or more extension communication ports for communication between neighbor fabric switches. Communication ports 1102 can include one or more TRILL ports capable of receiving frames encapsulated in a TRILL header. Communication ports 1102 can also include one or more IP ports capable of receiving IP packets. An IP port is capable of receiving an IP packet and can be configured with an IP address. Packet processor 1110 can process TRILL-encapsulated frames and/or IP packets.

During operation, persistent storage module 1130 stores configuration information associated with switch 1100 in a data structure (e.g., a table), which includes one or more columns for attribute values of the configuration information, in object relational database 1140 in storage device 1150. Restoration module 1132 instantiates a restoration database instance in database 1140 from a database image. Retrieval module 1170 retrieves attribute values from a table in a current database instance and the restoration database instance in database 1140. Restoration module 1132 then applies the differences between the attribute values of the restoration database instance and the current database instance in database 1140 to switch modules 1160, and operates the restoration database instance as the current database instance in database 1140.

The differences include attribute values to be removed from and added to switch modules 1160. Retrieval module 1170 can determine the differences based on a set difference between respective attribute values of the restoration database instance and the current database instance. Retrieval module 1170 can identify an element of the configuration information, which is associated with a class definition in a UML model, from a presentation layer. In some embodiments, restoration module 1132 may apply the attribute values to be removed before applying the attribute values to be added. Furthermore, restoration module 1132 applies the respective attribute values to be removed and to be added based on respective interdependencies of the attribute values. Restoration module 1132 can also associate a filename and a timestamp with the database image, and obtain the database image based on an indicator.

If switch 1100 is a member switch of a switch group, restoration module 1132 verifies whether the differences are prepared for storage in the database of a respective switch of the switch group. If prepared, restoration module 1132 generates an instruction message instructing to commit the differences to the persistent storage and switch modules of a respective switch of the switch group. If the differences are not prepared, restoration module 1132 rolls back the differences from a persistent storage of a switch, which has succeeded in storage preparation, of the switch group.

Note that the above-mentioned modules can be implemented in hardware as well as in software. In one embodiment, these modules can be embodied in computer-executable instructions stored in a memory which is coupled to one or more processors in switch 1100. When executed, these instructions cause the processor(s) to perform the aforementioned functions.

In summary, embodiments of the present invention provide a switch and a method for facilitating online restoration of a switch snapshot. In one embodiment, the switch includes one or more ports, a persistent storage module, a restoration module, and a retrieval module. The persistent storage module stores configuration information associated with the switch group in a table, which includes one or more columns for attribute values of the configuration information, in a local persistent storage. The restoration module instantiates a restoration database instance in the persistent storage from an image of the persistent storage. The retrieval module retrieves attribute values from a data structure in a current database instance and the restoration database instance in the persistent storage. The restoration module then applies the differences between the attribute values of the restoration database instance and the current database instance in the persistent storage to switch modules of the switch, and operates the restoration database instance as the current database instance in the persistent storage.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   persistent storage circuitry configured to store current database instance in a local persistent storage, wherein the current database instance includes current configuration information of the switch; and
   restoration circuitry configured to instantiate a restoration database instance in the persistent storage from an image of the persistent storage;
   retrieval circuitry configured to compute a difference of an attribute value from the current database instance and a corresponding attribute value from the restoration database instance in the persistent storage; and
   wherein the restoration circuitry is further configured to:
      apply the computed difference one or more corresponding hardware modules of the switch; and
      set the restoration database instance as the current database instance in the persistent storage.

2. The switch of claim 1, wherein a respective database instance includes a data structure, which is associated with a class definition from a class model, wherein the class model defines a name and one or more attributes for the class definition.

3. The switch of claim 2, wherein the retrieval circuitry is further configured to identify an element of the configuration information from a presentation layer, wherein the element of the configuration information is associated with the class definition in the class model.

4. The switch of claim 3, wherein the presentation layer represents a user view of the configuration information and dependencies of the element of the configuration information.

5. The switch of claim 1, wherein the attribute value is to be removed from or added to the hardware modules, wherein the restoration circuitry is further configured to apply an attribute value to be removed before applying an attribute value to be added.

6. The switch of claim 1, wherein the restoration circuitry is further configured to apply the computed difference based on an interdependency of the attribute value.

7. The switch of claim 1, wherein the retrieval circuitry is further configured to determine the computed difference based on a set difference between the attribute value of the restoration database instance and the corresponding attribute value from the current database instance.

8. The switch of claim 1, wherein the restoration circuitry is further configured to:
   associate a filename and a timestamp with the image of the persistent storage; and
   obtain the image of the persistent storage based on one or more of:
      an internal file structure of the switch;
      a file path in the switch, wherein the file path specified by a user;
      a location of an external file respiratory; and
      a checkpoint of the persistent storage.

9. The switch of claim 1, further comprising switch group circuitry configured to maintain a membership in a network of interconnected switches, wherein the network of interconnected switches is identified by a fabric switch.

10. The switch of claim 9, wherein the restoration circuitry is further configured to:
    verify whether the computed difference is prepared for storage in a persistent storage of a respective switch of the network of interconnected switches; and
    in response to verifying that the computed difference is prepared, generate an instruction message instructing to commit the differences to the persistent storage of a respective switch of the network of interconnected switches.

11. The switch of claim 10, wherein, in response to verifying that the computed difference is not prepared, the restoration circuitry is further configured to roll back the computed difference from a persistent storage of a switch, which has succeeded in storage preparation, of the network of interconnected switches.

12. The switch of claim 1, wherein the persistent storage is an object relational database, and wherein a data structure in the persistent storage is a table in the database.

13. A method, comprising:
    storing a current database instance in a local persistent storage of a switch, wherein the current database instance includes current configuration information of the switch; and
    instantiating a restoration database instance in the persistent storage from an image of the persistent storage;
    computing a difference of an attribute value from the current database instance and a corresponding attribute value from the restoration database instance in the persistent storage;
    applying the computed difference to one or more corresponding switch modules of the switch; and
    setting the restoration database instance as the current database instance in the persistent storage.

14. The method of claim 13, wherein a respective database instance includes a data structure, which is associated with a class definition from a class model, wherein the class model defines a name and one or more attributes for the class definition.

15. The method of claim 14, further comprising identifying an element of the configuration information from a presentation layer, wherein the element of the configuration information is associated with the class definition in the class model.

16. The method of claim 15, wherein the presentation layer represents a user view of the configuration information and dependencies of the element of the configuration information.

17. The method of claim 13, wherein the attribute value is to be removed from or added to the switch modules, wherein the method further comprises applying an attribute value to be removed before applying an attribute value to be added.

18. The method of claim 13, further comprising applying the computed difference based on an interdependency of the attribute value.

19. The method of claim 13, further comprising determining the computed difference based on a set difference between the attribute value of the restoration database instance and the corresponding attribute value from the current database instance.

20. The method of claim 13, further comprising:
associating a filename and a timestamp with the image of the persistent storage; and
obtaining the image of the persistent storage based on one or more of:
an internal file structure of the switch;
a file path in the switch, wherein the file path specified by a user;
a location of an external file respiratory; and
a checkpoint of the persistent storage.

21. The method of claim 13, further comprising maintaining a membership in a network of interconnected switches, wherein the network of interconnected switches is identified by a fabric identifier.

22. The method of claim 21, further comprising:
verifying whether the computed difference is prepared for storage in a persistent storage of a respective switch of the network of interconnected switches; and
in response to verifying that the computed difference is prepared, generating an instruction message instructing to commit the computed difference to the persistent storage of a respective switch of the network of interconnected switches.

23. The method of claim 22, wherein, in response to verifying that the computed difference is not prepared, further comprising rolling back the computed difference from a persistent storage of a switch, which has succeeded in storage preparation, of the network of interconnected switches.

24. The method of claim 13, wherein the persistent storage is an object relational database, and wherein a data in the persistent storage is a table in the database.

* * * * *

UNITED STATES PATENT AND TRADEMARK OFFICE
CERTIFICATE OF CORRECTION

PATENT NO. : 9,626,255 B2  
APPLICATION NO. : 14/588106  
DATED : April 18, 2017  
INVENTOR(S) : Vidyasagara R. Guntaka et al.

Page 1 of 1

It is certified that error appears in the above-identified patent and that said Letters Patent is hereby corrected as shown below:

In the Claims

Column 35, Line 45 should read as follows:
"apply the computed difference to one or more correspond-"

Column 38, Line 23-24 should read as follows:
"storage is an object relational database, and wherein a data structure in the persistent storage is a table in the database."

Signed and Sealed this
Twentieth Day of June, 2017

Joseph Matal
*Performing the Functions and Duties of the
Under Secretary of Commerce for Intellectual Property and
Director of the United States Patent and Trademark Office*